US008503625B2

(12) United States Patent
Smith, Jr.

(10) Patent No.: US 8,503,625 B2
(45) Date of Patent: Aug. 6, 2013

(54) MANAGING PACKET-BASED VOICEMAIL MESSAGES

(75) Inventor: Leonard Smith, Jr., Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1604 days.

(21) Appl. No.: 11/446,346

(22) Filed: Jun. 1, 2006

(65) Prior Publication Data

US 2007/0280435 A1    Dec. 6, 2007

(51) Int. Cl.
*H04M 1/64* (2006.01)
*H04M 11/10* (2006.01)

(52) U.S. Cl.
USPC ........................................ 379/88.23; 455/413

(58) Field of Classification Search
USPC .......... 379/67.01, 88.16, 88.18, 88.26, 88.25, 379/41, 51, 68, 373.04
See application file for complete search history.

(56) References Cited

U.S. PATENT DOCUMENTS

| | | | | |
|---|---|---|---|---|
| 5,568,540 | A * | 10/1996 | Greco et al. | 379/88.25 |
| 5,579,472 | A | 11/1996 | Keyworth et al. | 715/751 |
| 6,044,134 | A | 3/2000 | De La Huerga | 379/88.08 |
| 6,181,780 | B1 | 1/2001 | Finnigan | 379/67.1 |
| 6,608,373 | B2 | 8/2003 | Wu et al. | 379/88.01 |
| 6,868,143 | B1 | 3/2005 | Menon et al. | 379/88.13 |
| 6,876,729 | B1 | 4/2005 | Kuter et al. | 379/88.22 |
| 7,065,187 | B2 | 6/2006 | Myers et al. | 379/88.22 |
| 7,203,286 | B1 | 4/2007 | Brockenbrough et al. | 379/76 |
| 7,216,221 | B2 | 5/2007 | Bear et al. | 713/1 |
| 7,359,493 | B1 * | 4/2008 | Wang et al. | 379/88.23 |
| 7,568,151 | B2 | 7/2009 | Bargeron et al. | 715/231 |
| 7,738,636 | B1 * | 6/2010 | Wageman et al. | 379/88.12 |
| 2002/0075815 | A1 * | 6/2002 | Sharma et al. | 370/276 |
| 2003/0128820 | A1 * | 7/2003 | Hirschberg et al. | 379/88.14 |
| 2005/0037739 | A1 * | 2/2005 | Zhong | 455/413 |
| 2005/0238147 | A1 | 10/2005 | Carro | 379/88.13 |
| 2006/0087978 | A1 * | 4/2006 | Sullivan et al. | 370/242 |
| 2007/0280434 | A1 | 12/2007 | Howell et al. | 379/88.16 |

OTHER PUBLICATIONS

Office Action mailed Oct. 28, 2009, issued in U.S. Appl. No. 11/445,057.
Office Action mailed Apr. 14, 2010, issued in U.S. Appl. No. 11/445,057.
Office Action mailed Mar. 27, 2012, issued in U.S. Appl. No. 11/445,057.
Office Action mailed Aug. 13, 2012, issued in U.S. Appl. No. 11/445,057.
(User's Guide) Creative Sound Blaster Live! Digital Enterainment 5.1, Creative Audio Software, Oct. 2000, Creative Technology Ltd. pp. 1-66.

* cited by examiner

*Primary Examiner* — Simon Sing
*Assistant Examiner* — Solomon Bezuayehu
(74) *Attorney, Agent, or Firm* — Merchant & Gould

(57) ABSTRACT

Aspects of present invention provide a method, computer-readable medium, and system for saving and modifying a draft voicemail message. More specifically, a caller may create a draft voicemail message that is saved without being transmitted to a callee. Then the caller may access the draft voicemail message and generate events to modify the message. More specifically, when a modification event is generated, event data that describes the modification to the voicemail message requested by the caller is received. Then, the data included with the voicemail message is updated to reflect the input received from the caller.

20 Claims, 16 Drawing Sheets

MANAGING PACKET-BASED VOICEMAIL MESSAGES

BACKGROUND

Generally described, an Internet telephony system provides an opportunity for users to have a call connection with enhanced calling features compared to a conventional telephony system. In a typical Internet telephony system, often referred to as Voice over Internet Protocol (VoIP), audio information is processed into a sequence of data blocks, called packets, for communications utilizing an Internet Protocol (IP) data network. During a VoIP call conversation, the voice is converted into small frames of voice data according to a network layer protocol used in the IP data network and a voice data packet is assembled by adding an IP header to the frame of voice data that is transmitted and received.

A typical Internet telephony system may include a voicemail system that allows a caller to leave a message for a callee. However, currently, a caller is not able to save a voicemail message so the message may be subsequently modified. Instead, a caller may be required to repetitively create entirely new voicemail messages if a previously created message contains any undesirable content. As a result, a caller may waste time and effort in creating new messages even in instances when modifications would be sufficient to put an existing message into the desired state.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, aspects of the present invention are directed at software systems for saving and modifying a draft voicemail message. More specifically, using the present invention, a caller may create a draft voicemail message that is saved without being transmitted to a callee. Then, the caller may subsequently access the draft voicemail message and generate events to modify the message. When a modification event is generated, event data that describes the modification requested by the caller is received. The event data is used to perform an update to the voicemail message that reflects the event generated by the caller. Once the modification is implemented, the voicemail message may be transmitted to a callee.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Generally described, aspects of present invention are directed at software systems for saving and modifying a draft voicemail message. More specifically, using the present invention, a caller may create a draft voicemail message that is saved without being transmitted to a callee. Then the caller may subsequently access the draft voicemail message and generate events to modify the message. When a modification event is generated, event data that describes the modification requested by the caller is received. The event data is used to perform an update to the voicemail message that reflects the input obtained from the caller. Once the modification is implemented, the voicemail message may be transmitted to one or more callees.

Figure 1:
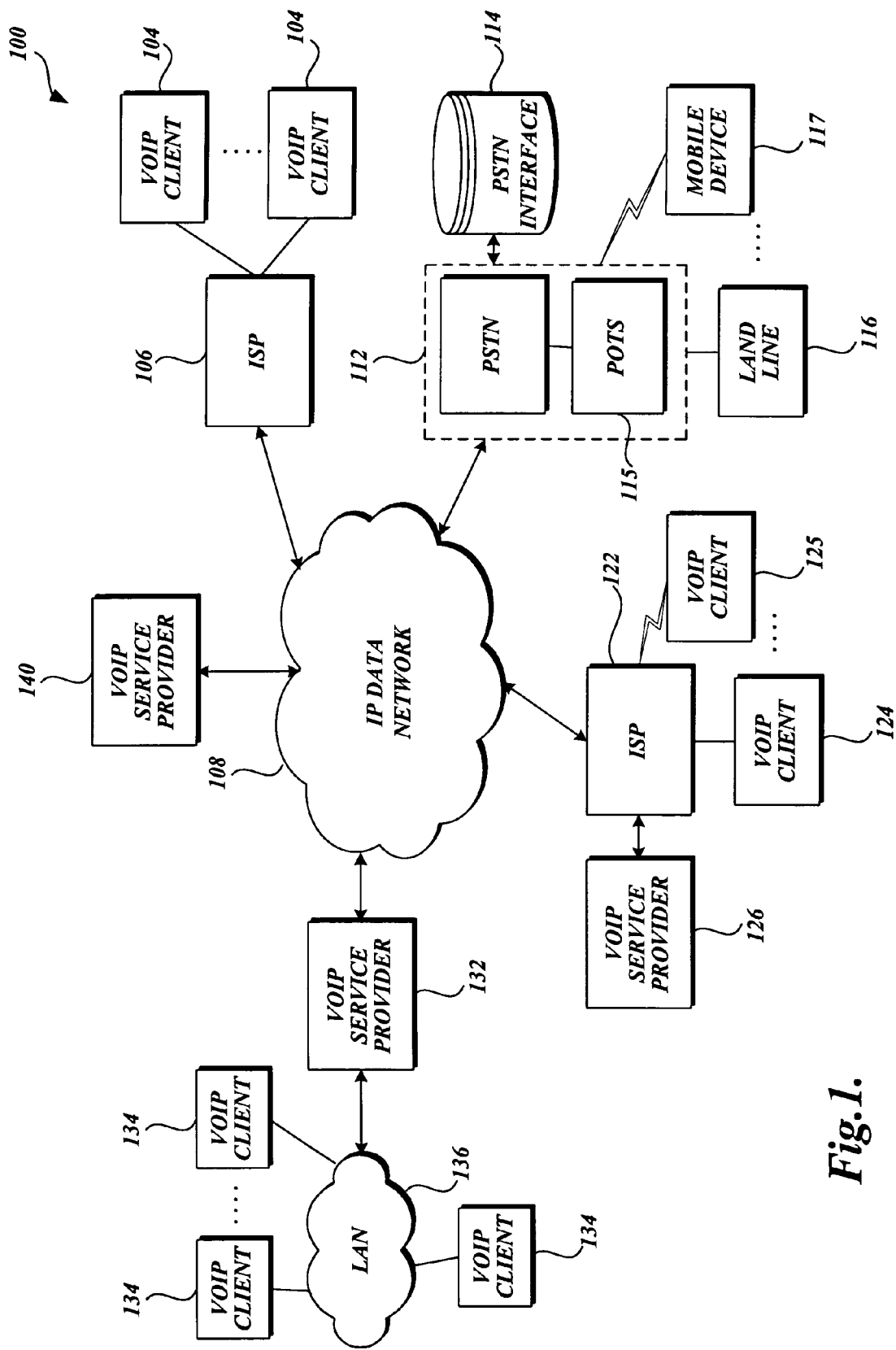
FIG. 1 is a block diagram illustrative of a VoIP environment for establishing a conversation channel between various clients in accordance with an aspect of the present invention.

With reference to FIG. 1, a block diagram of an IP telephony environment 100 for providing IP telephone services between various "VoIP clients" is shown. A "VoIP client" or a "client," as used herein, refers to a particular contact point, such as an individual, an organization, a company, etc., one or more associated VoIP devices and a unique VoIP client identifier. For example, a single individual, five associated VoIP devices and a unique VoIP client identifier collectively makeup a VoIP client. Similarly, a company including five hundred individuals and over one thousand associated VoIP devices may also be collectively referred to as a VoIP client and that VoIP client may be identified by a unique VoIP client identifier. Moreover, VoIP devices may be associated with multiple VoIP clients. For example, a computer (a VoIP device) located in a residence in which three different individuals live, each individual associated with separate VoIP clients, may be associated with each of the three VoIP clients. Regardless of the combination of devices, the unique VoIP client identifier may be used within a voice system to reach the contact point of the VoIP client.

Generally described, the IP telephony environment 100 may include an IP data network 108 such as the Internet, an intranet network, a wide area network (WAN), a local area network (LAN), and the like. The IP telephony environment 100 may further include VoIP service providers 126, 132 providing VoIP services to VoIP clients 124, 125, 134. A VoIP call conversation may be exchanged as a stream of data packets corresponding to voice information, media information, and/or contextual information. As will be discussed in greater detail below, the contextual information includes metadata (information of information) relating to the VoIP conversation, the devices being used in the conversation, the contact point of the connected VoIP clients, and/or individuals that are identified by the contact point (e.g., employees of a company).

The IP telephony environment 100 may also include third party VoIP service providers 140. The VoIP service providers 126, 132, 140 may provide various calling features, such as incoming call-filtering, text data, voice and media data integration, and the integrated data transmission as part of a VoIP call conversation. Moreover, the VoIP service provider 126, 132, 140 may provide a voicemail system for storing voicemail messages. In this regard, VoIP clients 104, 124, 125, 136 may create, maintain, and define preferences for a voicemail box to store incoming voicemail messages. Moreover, the VoIP service providers 126, 132, 140 or VoIP clients 104, 124, 125, 136 may filter voicemail messages and/or identify data that is related to a voicemail message.

VoIP service providers 132 may be coupled to a private network such as a company LAN 136, providing IP telephone services (e.g., internal calls within the private network, external calls outside of the private network, and the like) and multimedia data services to several VoIP clients 134 communicatively connected to the company LAN 136. Similarly, VoIP service providers, such as VoIP service provider 126, may be coupled to Internet Service Provider (ISP) 122, providing IP telephone services and VoIP services, including voicemail, for clients of the ISP 122.

In one embodiment, one or more ISPs 106, 122 may be configured to provide Internet access to VoIP clients 104, 124, 125 so that the VoIP clients 104, 124, 125 can maintain conversation channels established over the Internet. The VoIP clients 104, 124, 125 connected to the ISP 106, 122 may use wired and/or wireless communication lines. Further, each VoIP client 104, 124, 125, 134 can communicate with Plain Old Telephone Service (POTS) 115 communicatively connected to a PSTN 112. A PSTN interface 114 such as a PSTN gateway may provide access between PSTN and the IP data network 108. The PSTN interface 114 may translate VoIP data packets into circuit switched voice traffic for PSTN and vice versa. The PSTN 112 may include a land line device 116, a mobile device 117, and the like.

Conventional voice devices, such as land line 116 may request a connection with the VoIP client based on the unique VoIP identifier of that client and the appropriate VoIP device associated with the VoIP client, will be used to establish a connection. In one example, an individual associated with the VoIP client may specify which devices are to be used in connecting a call based on a variety of conditions (e.g., connection based on the calling party, the time of day, etc.). Also, in instances when a callee is unavailable, or other condition is satisfied, a request may be forwarded to a VoIP client that provides a voicemail system. In this instance, a communication channel between a caller and callee is not established. Instead, a communication channel is established so that a caller may interact with the voicemail system for the purpose of leaving a voicemail message.

It is understood that the above mentioned configuration in the environment 100 is merely exemplary. It will be appreciated by one of ordinary skill in the art that any suitable configurations with various VoIP entities can be part of the environment 100. For example, VoIP clients 134 coupled to LAN 136 may be able to communicate with other VoIP clients 104, 124, 125, 134 with or without VoIP service providers 132 or ISP 106, 122. Further, an ISP 106, 122 can also provide VoIP services to its client.

Figure 2:
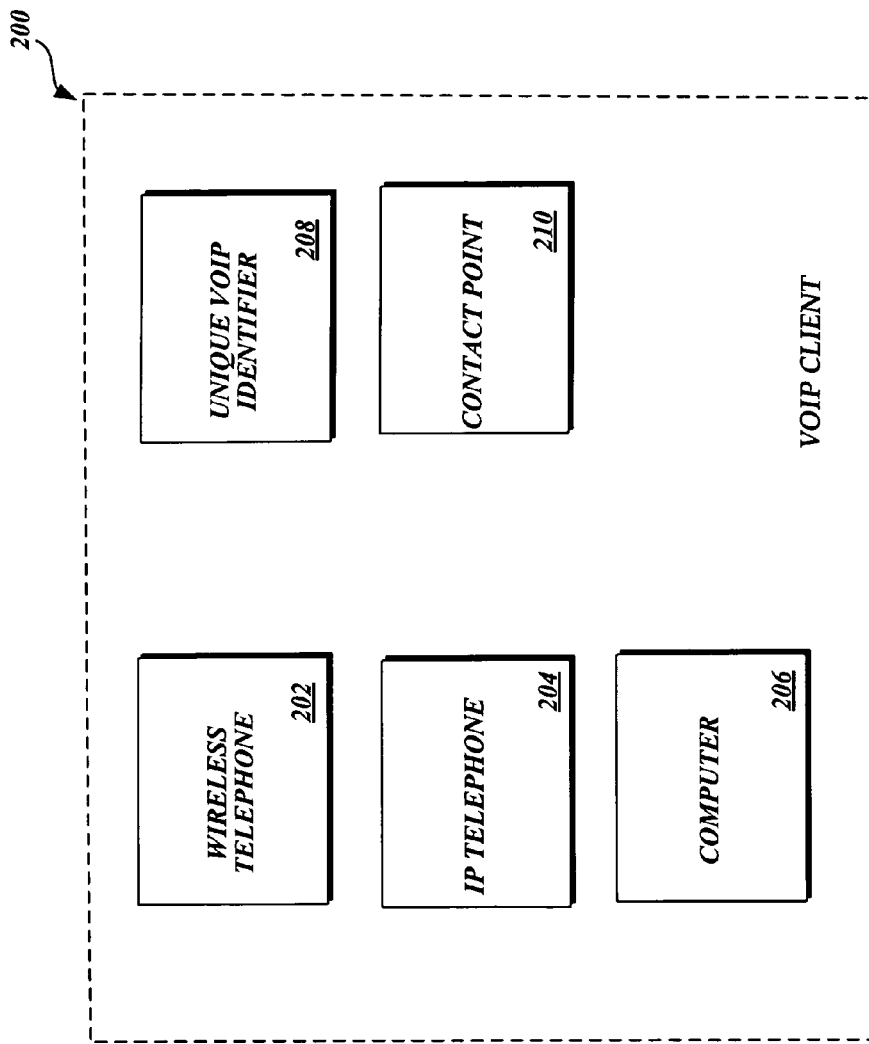
FIG. 2 is a block diagram illustrative of a VoIP client in accordance with an aspect of the present invention.

Referring now to FIG. 2, a block diagram illustrating an exemplary VoIP client 200 that includes several VoIP devices and a unique VoIP identifier, in accordance with an embodiment of the present invention, is shown. Each VoIP device 202, 204, 206 may include a storage that is used to maintain voicemail messages, address books, client specified rules, priority information related to incoming calls and voicemail messages, etc. Alternatively, or in addition thereto, a separate storage maintained, for example, by a service provider may be associated with the VoIP client and accessible by each VoIP device that contains information relating to the VoIP client. Any suitable VoIP device such as a wireless phone 202, an IP phone 204, or a computer 206 with proper VoIP applications may be part of the VoIP client 200. In one embodiment, an application that is part of the VoIP client 200 is configured to provide services with regard to voicemail messages. The application may include, among other things, software for managing packet-based voicemail messages. As described in further detail below with reference to FIGS. 7-10, the software for managing packet-based voicemail messages provides a way for a caller to save a voicemail message in draft form, among other things. The VoIP client 200 also maintains one or more unique VoIP identifier 208. The unique VoIP identifier(s) 208 may be constant or change over time. For example, the unique identifier(s) 208 may change with each call. The unique VoIP identifier is used to identify the client and to connect with the contact point 210 associated with the VoIP client. The unique VoIP identifier may be maintained on each VoIP device included in the VoIP client and/or maintained by a service provider that includes an association with each VoIP device included in the VoIP client. In the instance in which the unique VoIP identifier is maintained by a service provider, the service provider may include information about each associated VoIP device and knowledge as to which device(s) to connect for incoming communications. In an alternative embodiment, the VoIP client 200 may maintain multiple VoIP identifiers. In this embodiment, a unique VoIP identifier may be temporarily assigned to the VoIP client 200 for each call session.

The unique VoIP identifier may be similar to a telephone number in PSTN. However, instead of dialing a typical telephone number to ring a specific PSTN device, such as a home phone, the unique VoIP identifier is used to reach a contact point, such as an individual or company, which is associated with the VoIP client. Based on the arrangement of the client, the appropriate device(s) will be connected to reach the contact point or leave a voicemail message for the contact point. In one embodiment, each VoIP device included in the VoIP client may also have its own physical address in the network or a unique device number. For example, if an individual makes a phone call to a POTS client using a personal computer (VoIP device), the VoIP client identification number in conjunction with an IP address of the personal computer will eventually be converted into a telephone number recognizable in PSTN.

Figure 3:
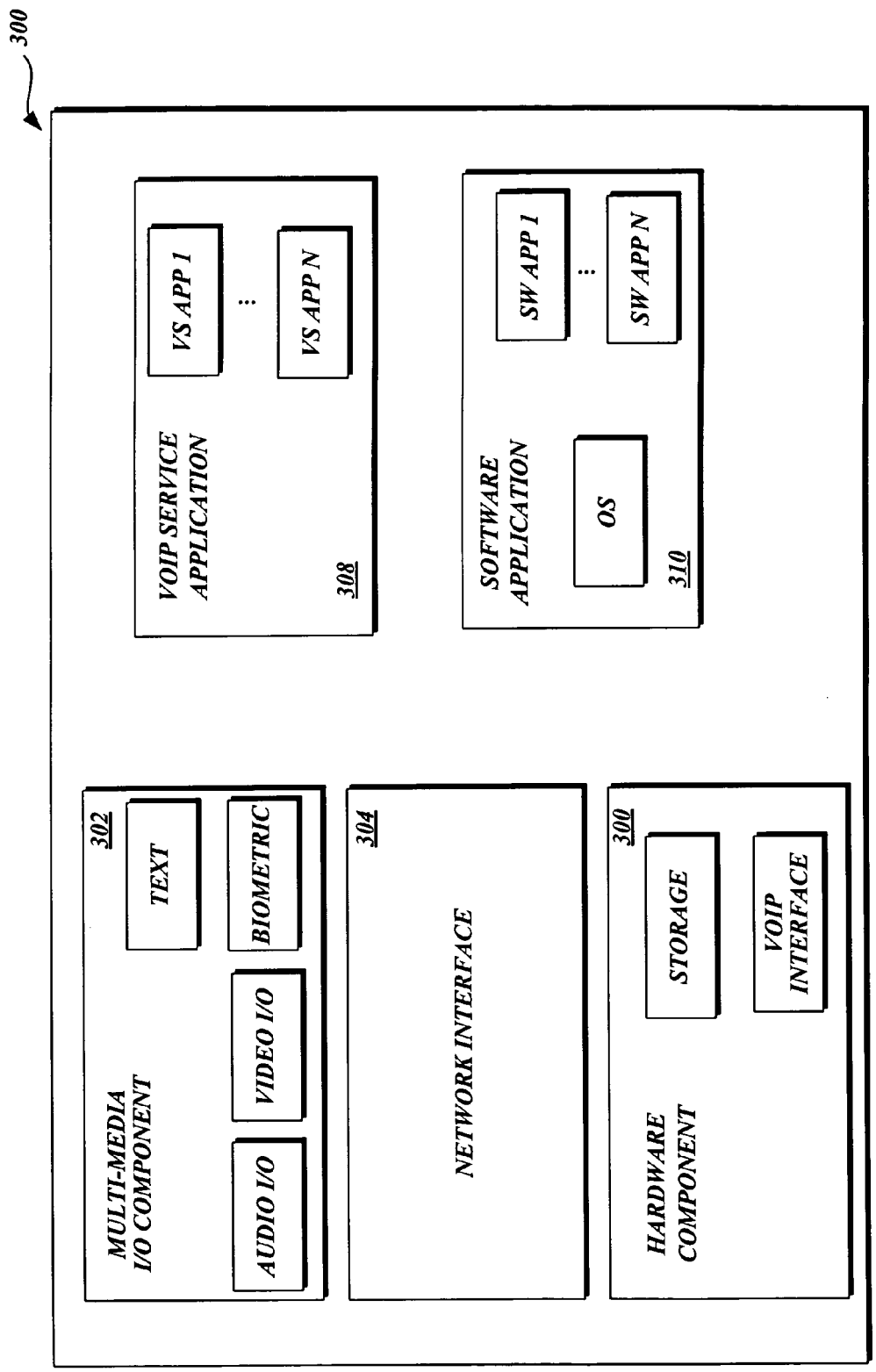
FIG. 3 is a block diagram illustrative of various components associated with a VoIP device in accordance with an aspect of the present invention.

FIG. 3 is a block diagram of a VoIP device 300 that may be associated with one or more VoIP clients and used with embodiments of the present invention. It is to be noted that the VoIP device 300 is described as an example. It will be appreciated that any suitable device with various other components can be used with embodiments of the present invention. For utilizing VoIP services, the VoIP device 300 may include components suitable for receiving, transmitting and processing various types of data packets. For example, the VoIP device 300 may include a multimedia input/output component 302 and a network interface component 304. The multimedia input/output component 302 may be configured to input and/or output multimedia data (including audio, video, and the like), user biometrics, text, application file data, etc. The multimedia input/output component 302 may include any suitable user input/output components such as a microphone, a video camera, a display screen, a keyboard, user biometric recognition devices, and the like. The multimedia input/output component 302 may also receive and transmit multimedia data via the network interface component 304. The network interface component 304 may support interfaces such as Ethernet interfaces, frame relay interfaces, cable interfaces, DSL interfaces, token ring interfaces, radio frequency (air interfaces); and the like. The VoIP device 300 may comprise a hardware component 306 including permanent and/or removable storage such as read-only memory devices (ROM), random access memory (RAM), hard drives, optical drives, and the like. The storage may be configured to store program instructions for controlling the operation of an operating system and/or one or more applications and to store contextual information related to individuals (e.g., voice profiles, voicemail configuration, user biometrics information, etc.) associated with the VoIP client in which the device is included. In one embodiment, the hardware component 306 may include a VoIP interface card which allows a non-VoIP client device to transmit and receive a VoIP conversation or leave a voicemail message.

The device 300 may further include a software application component 310 for the operation of the device 300 and a VoIP Service application component 308 for supporting various VoIP services. The VoIP service application component 308 may include applications such as data packet assembler/disassembler applications, a structured hierarchy parsing application, audio Coder/Decoder (CODEC), and video CODEC. The CODEC may use voice profiles to filter and improve incoming audio. In one embodiment, the software application component includes an application for obtaining and processing voicemail messages. The application may be configured to obtain voicemail messages as attachments to e-mails or may be an application configured to allow individuals to send/receive calls and voicemail messages.

Figure 4A:
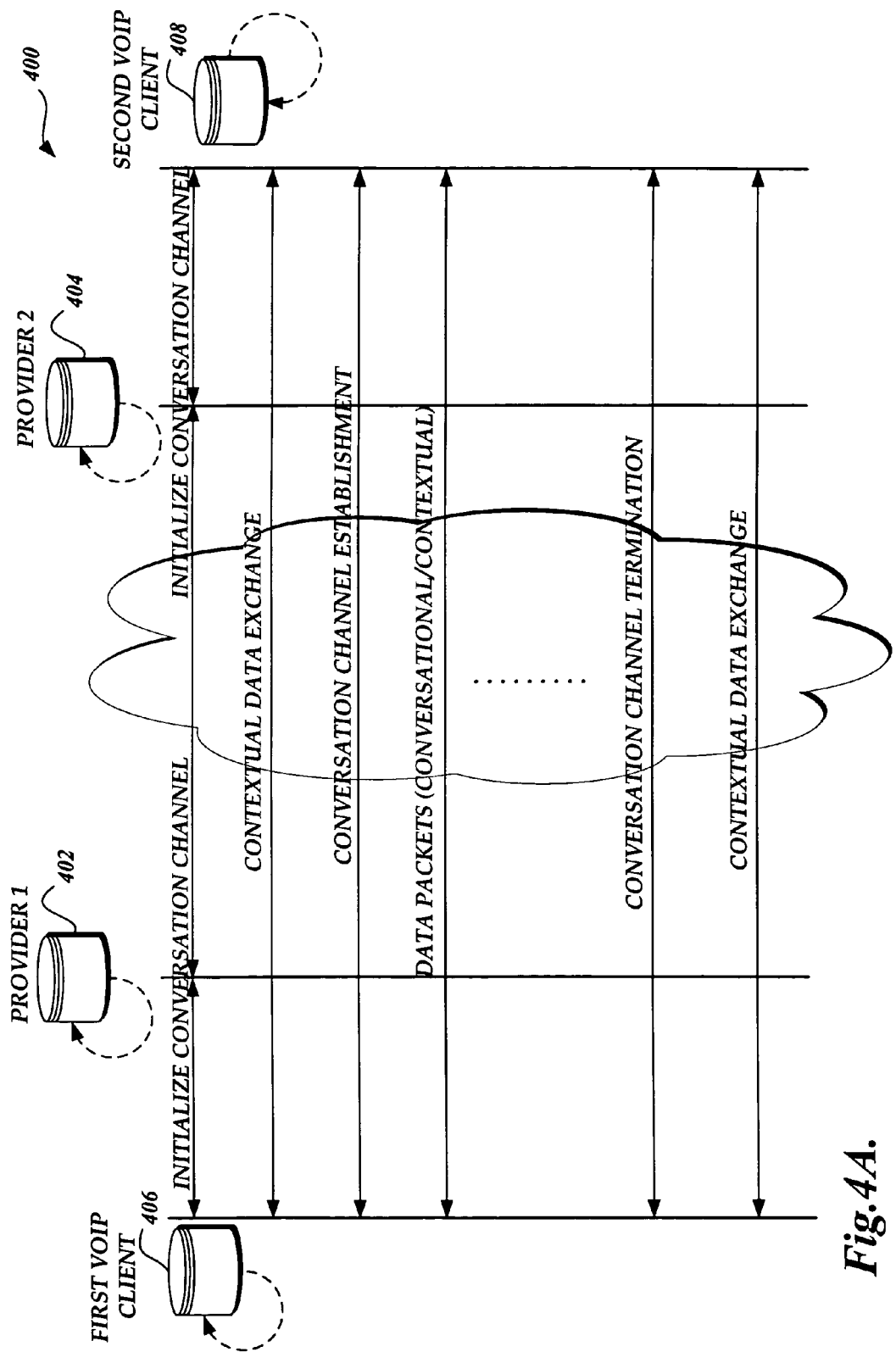
FIGS. 4A and 4B are block diagrams illustrative of the exchange of data between two VoIP clients over a conversation channel in accordance with an aspect of the present invention.

With reference to FIG. 4A, a block diagram illustrative of a conversation flow 400 between VoIP devices of two different VoIP clients over a conversation channel, in accordance with an embodiment of the present invention, is shown. During a connection set-up phase, a VoIP device of a first VoIP client 406 requests to initiate a conversation channel with a second VoIP client 408. In an illustrative embodiment, a VoIP service provider 402 (Provider 1) for the first VoIP client 406 receives the request to initiate a conversation channel and forwards the request to a VoIP service provider 404 (Provider 2) for the second VoIP client 406. While this example utilizes two VoIP service providers and two VoIP clients, any number and combination of VoIP clients and/or service providers may be used with embodiments of the present invention. For example, only one service provider may be utilized in establishing the connection. In yet another example, communication between VoIP devices may be direct, utilizing public and private lines, thereby eliminating the need for a VoIP service provider. In a peer to peer context, communication between VoIP devices may also be direct without having any service providers involved.

There are a variety of protocols that may be selected for use in exchanging information between VoIP clients, VoIP devices, and/or VoIP service providers. For example, when Session Initiation Protocol (SIP) is selected for a signaling protocol, session control information and messages will be exchanged over a SIP signaling path/channel and media streams will be exchanged over Real-Time Transport Protocol (RTP) path/channel. For the purpose of discussion, a communication channel, as used herein, generally refers to any type of data or signal exchange path/channel. Thus, it will be appreciated that depending on the protocol, a connection set-up phase and a connection termination phase may require additional steps in the conversation flow 400.

For ease of explanation, we will utilize the example in which both the first VoIP client 406 and the second VoIP client 408 each only includes one VoIP device. Accordingly, the discussion provided herein will refer to connection of the two VoIP devices. The individual using the device of the first VoIP client 406 may select or enter the unique VoIP identifier of the client that is to be called. Provider 1 402 receives the request from the device of the first VoIP client 408 and determines a terminating service provider (e.g., Provider 2 404 of the second VoIP client 408) based on the unique VoIP identifier included in the request. The request is then forwarded to Provider 2 404. This call initiation will be forwarded to the device of the second VoIP client. A conversation channel between the device of the first VoIP client 406 and a device of the second VoIP client 408 can then be established. In one embodiment, if a conversation channel cannot be established because a callee is unavailable, or other condition is satisfied, Provider 2 404 forwards the request to a voicemail system. In one embodiment, the voicemail system may reside on a different client. In this instance, the second VoIP 406 may be used to access conversation and contextual data obtained by the client that provides the voicemail system. While the discussion provided below describes the exchange of data occurring in a real-time call, this discussion also applies to communications that are stored as voicemail messages.

In an illustrative embodiment, before the devices of the first VoIP client 406 and the second VoIP client 408 begin to exchange data packets, contextual information may be exchanged. As will be discussed in a greater detail below, the contextual information may be packetized in accordance with a predefined structure that is associated with the conversation. Any device associated with the first VoIP client 406, the service provider of the first VoIP client 406, or a different device/service provider may determine the structure based on the content of the contextual information. In one embodiment, the exchanged contextual information may include information relating to the calling VoIP client 406, the device, and the VoIP client 408 being called.

Available media types, rules of the calling client and the client being called, and the like, may also be part of the contextual information that is exchanged during the connection set-up phase. The contextual information may be processed and collected by one of the devices of the first VoIP client 406, one of the devices of the second VoIP client 408, and/or by VoIP service providers (e.g., Provider 1 402 and Provider 2 404), depending on the nature of the contextual information. In one embodiment, the VoIP service providers 402, 404 may add/or delete some information to/from the client's contextual information before forwarding the contextual information.

In response to a request to initiate a conversation channel, the second VoIP client 408 may accept the request for establishing a conversation channel or perform other appropriate actions, such as rejecting the request and forwarding the request to a client that provides a voicemail system. When a conversation channel is established, a device of the first VoIP client 406 and a device of the second VoIP client 408 start communicating with each other by exchanging data packets. The data packets, including conversation data packets and contextual data packets, are communicated over the established conversation channel between the connected devices.

Conversation data packets carry data related to a conversation, for example, a voice data packet, or multimedia data packet. Contextual data packets carry information relating to data other than the conversation data. Once the conversation channel is established, either the first VoIP client 406 or the second VoIP client 408 can request to terminate the conversation channel. Some contextual information may be exchanged between the first VoIP client 406 and the second VoIP client 408 after the termination.

Figure 4B:
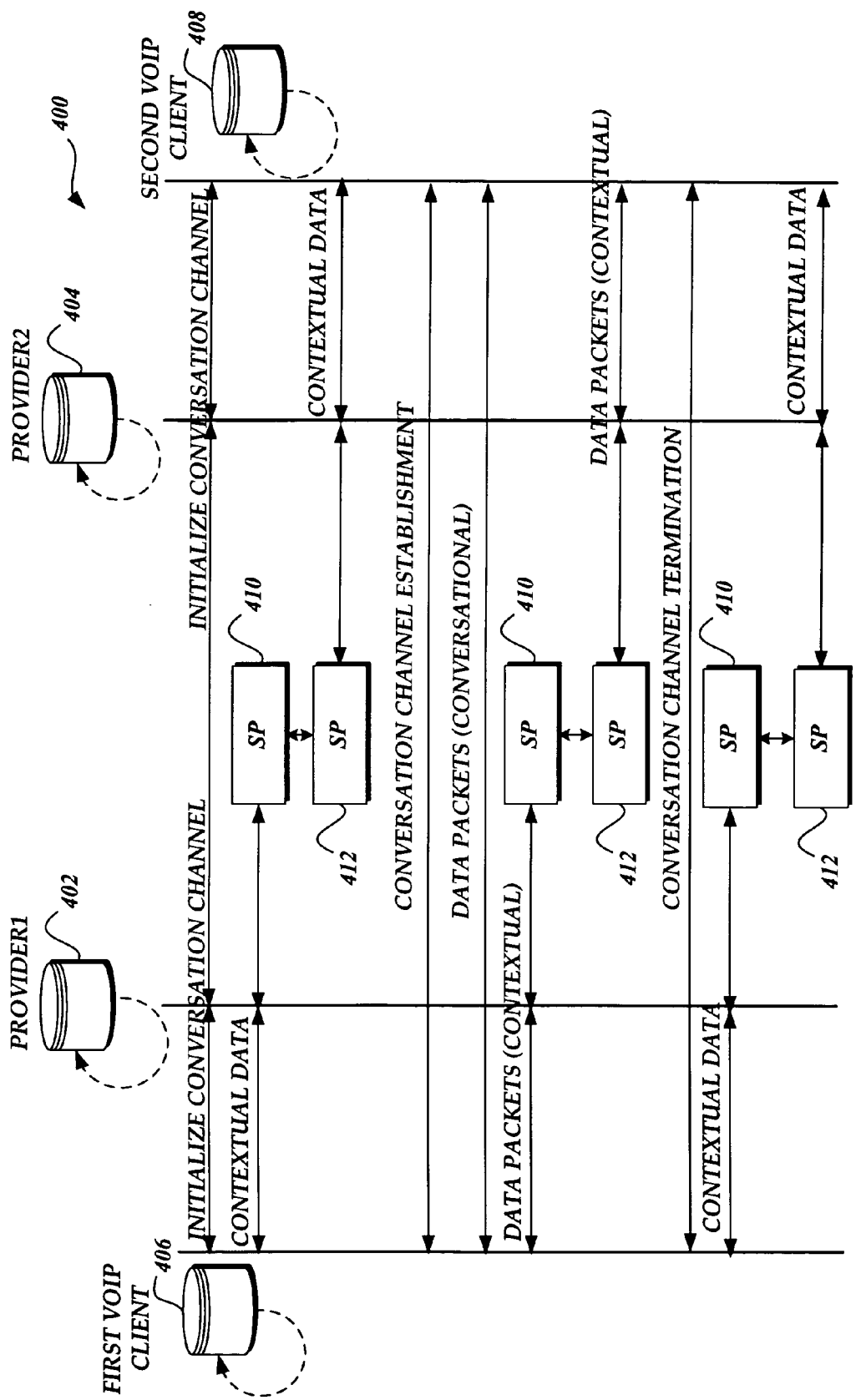

FIG. 4B is a block diagram illustrative of a conversation flow 400 between devices of two VoIP clients via several service providers, in accordance with an embodiment of the present invention. As with FIG. 4A, the example described herein will utilize the scenario in which each client only has one device associated therewith and the connection occurs between those two devices. During a connection set-up phase, a device of a first VoIP client 406 requests to initiate a conversation channel for communication with a second VoIP client 408. In an illustrative embodiment, a VoIP service provider 402 (Provider1) for the first VoIP client 406 receives the request to initiate a conversation channel and forwards the request to a VoIP service provider 404 (Provider2) for the second VoIP client 408.

Before the device of the first VoIP client 406 and the device of the second VoIP client 408 begin to exchange voice data packets, contextual information may be exchanged between the first VoIP client 406 and the second VoIP client 408. Contextual information may be exchanged using a structured organization defined by the first VoIP client 406. In one embodiment, Provider 1 402 may identify particular contextual information which Provider 1 402 desires to obtain from the first VoIP client 406. The first VoIP client 406 may specify the corresponding structure based on the content of the contextual information. The identification of the structure for exchanging information and additional contextual information may be transmitted to the second VoIP client 408 via Provider 2 404 and Provider 1 402.

The contextual information may be processed and collected at a device of the first VoIP client, a device of the second VoIP client, and/or the VoIP service providers (e.g., Provider1 and Provider2), depending on the nature of the contextual information. For example, voicemail message may be collected by a service provider and temporarily provided to the devices. Further, third party Service Provider(s) (third party SP) 410, 412 can obtain and/or add contextual information exchanged among devices of the first VoIP client 406 and second VoIP client 408, Provider 1 402, and Provider 2 404. In one embodiment, any of Provider 1 402, Provider 2 404, and third party SP 410, 412 may add, modify and/or delete contextual information to a call or voicemail message before forwarding the contextual information to the next VoIP device(s), including other service providers.

In response to a request to initiate a conversation channel, the second VoIP client 408 may accept the request for establishing a conversation channel or reject the request via Provider 2 404. When a conversation channel has been established, the devices of the first VoIP client 406 and the second VoIP client 408 start communicating with each other by exchanging data packets as discussed above. In one embodiment, contextual and/or conversation data packets may be forwarded to third party SPs 410, 412 from Provider 1 402, Provider 2 404, or from either VoIP client 406, 408. Further, the forwarded contextual and/or conversation data packets may be exchanged among various third party SPs 410, 412.

Figure 5:
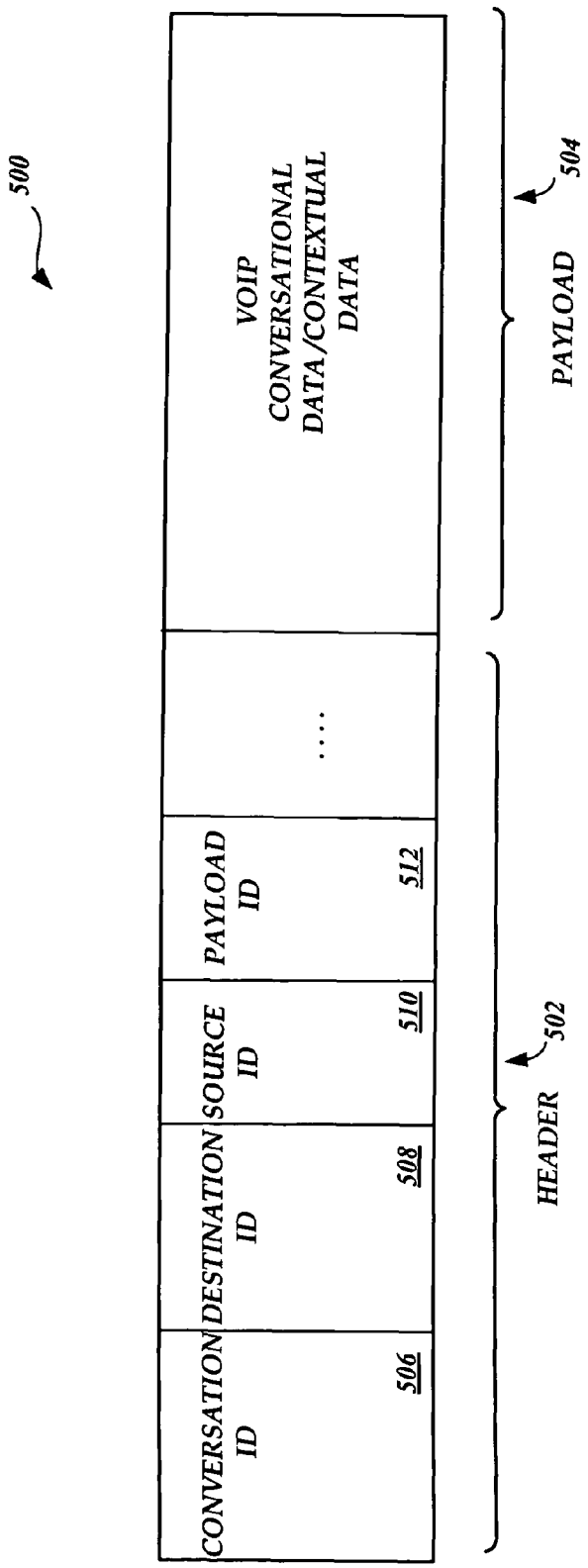
FIG. 5 is a block diagram of a data packet used over a communication channel established in the VoIP environment of FIG. 1.

FIG. 5 is a block diagram of a data packet structure 500 used over a communication (conversation) channel in accordance with an embodiment of the present invention. The data packet structure 500 may be a data packet structure for an IP data packet suitable for being utilized to carry conversation data (e.g., voice, multimedia data, and the like) or contextual data (e.g., information relating to the VoIP services, and the like). However, any other suitable data structure can be utilized to carry conversation data or contextual data communicated in a call or a voicemail message. The data packet structure 500 includes a header 502 and a payload 504. The header 502 may contain information necessary to deliver the corresponding data packet to a destination. In this regard, a VoIP service provider or other VoIP entities may modify header information in certain circumstances. For example, if a caller is being forwarded to a voicemail system, the original destination of a data packet may be modified to identify a client that provides a voicemail system.

Additionally, the header 502 may include information utilized in the process of a conversation. Such information may include conversation ID 506 for identifying a conversation (e.g., call), a Destination ID 508, such as a unique VoIP identifier of the client being called, a Source ID 510 (unique VoIP identifier of the calling client or device identifier), Payload ID 512 for identifying type of payload (e.g., conversation or contextual), individual ID (not shown) for identifying the individual for which the conversation data is related, and the like. In an alternative embodiment, the header 502 may contain information regarding Internet protocol versions, and payload length, among others. The payload 504 may include conversational or contextual data relating to an identified conversation. As will be appreciated by one of ordinary skill in the art, additional headers may be used for upper layer headers such as a TCP header, a UDP header, and the like.

In one embodiment of the present invention, a structured hierarchy may be predefined for communicating contextual information over a VoIP conversation channel. The contextual information may include any information relating to VoIP clients, VoIP devices, conversation channel connections (e.g., call basics), conversation context (e.g., call context), and the like. More specifically, and as described in further detail below with reference to FIGS. 11-15, the contextual information may include client preference, client rules, security information such as authentication and permission levels, client's location (e.g., user location, device location, etc.), biometrics information, the client's confidential information, voicemail account configuration, VoIP device's functionality, VoIP service providers information, media type, media parameters, calling number priority, keywords, information relating to application files, and the like. The contextual information may be processed, collected, and/or disseminated at each VoIP client and/or the VoIP service providers depending on the nature of the contextual data. In one aspect, the VoIP service providers may add, modify, and/or delete VoIP client's contextual data before forwarding the contextual information. For example, client's confidential information will be deleted by the VoIP service provider associated with that client unless the client authorizes such information to be transmitted. In some cases, a minimal amount of contextual information is transmitted outside of an intranet network.

Figure 6:
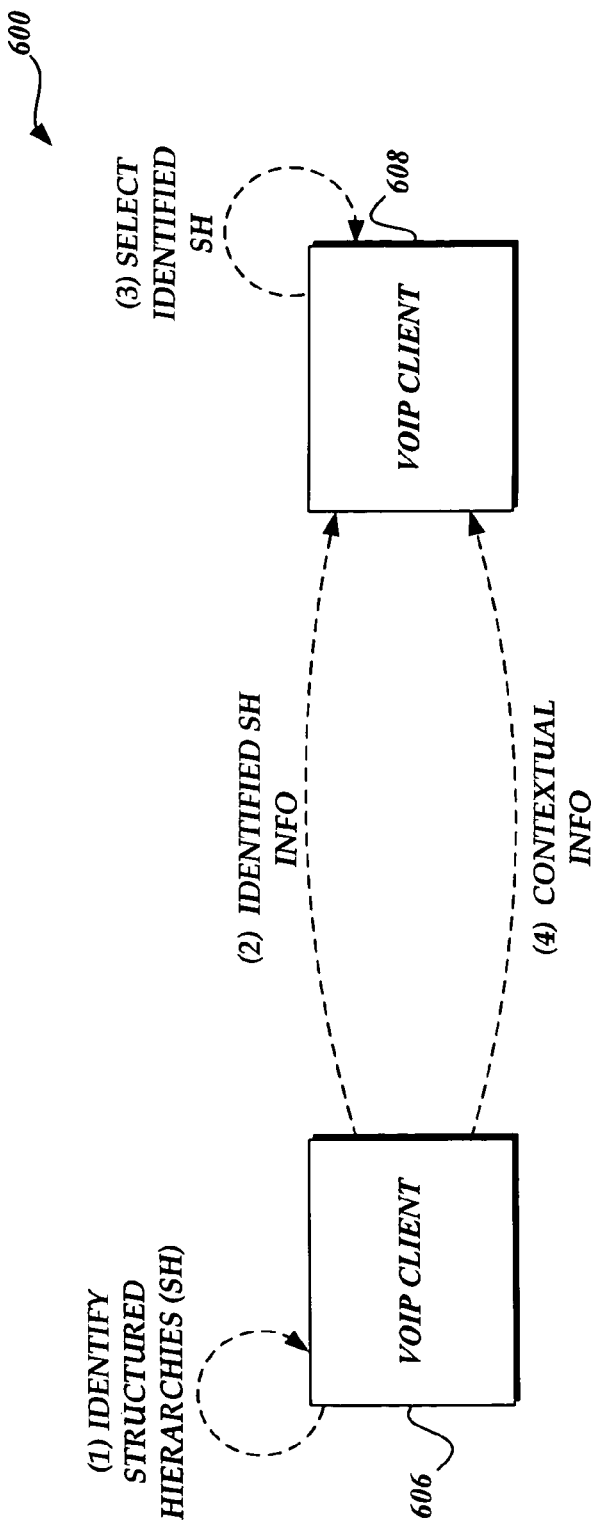
FIG. 6 is a block diagram illustrating interactions between two VoIP clients for transferring contextual information defined by identified structured hierarchies in accordance with an aspect of the present invention.

With reference to FIG. 6, a block diagram 600 illustrating interactions between two VoIP clients for transferring contextual information, in accordance with an embodiment of the present invention, is shown. As with FIGS. 4A and 4B, the example described herein will utilize the scenario in which each client only has one device associated therewith and the connection occurs between those two devices. In one embodiment, devices of VoIP Client 606 and VoIP Client 608 have established a VoIP conversation channel. It may be identified which structured hierarchies will be used to carry certain contextual information by VoIP Client 606. The information regarding the identified structured hierarchies may include information about which structured hierarchies are used to carry the contextual information, how to identify the structured hierarchy, and the like. Such information will be exchanged between VoIP Client 606 and VoIP Client 608 before the corresponding contextual information is exchanged. Upon receipt of the information about which structured hierarchy is used to carry the contextual information, VoIP Client 608 looks up predefined structured hierarchies (e.g., XML namespace, and the like) to select the identified structured hierarchies. In one embodiment, the predefined structured hierarchies can be globally stored and managed in a centralized location accessible from a group of VoIP clients. In this embodiment, a Uniform Resource Identifier (URI) address of the centralized location may be transmitted from VoIP Client 606 to VoIP Client 608.

In another embodiment, each VoIP client may have a set of predefined structured hierarchies stored in a local storage of any devices or a dedicated local storage, which all devices can share. The predefined structured hierarchies may be declared and agreed upon between VoIP clients before contextual information is exchanged. In this manner, the need to provide the structure of the contextual data packets may be eliminated and thus the amount of transmitted data packets corresponding to the contextual data is reduced. Further, by employing the predefined structured hierarchies, data packets can be transmitted in a manner, which is independent of hardware and/or software.

Upon retrieving the identified structured hierarchy, VoIP Client 608 is expecting to receive a data stream such that data packets corresponding to the data stream are defined according to the identified structured hierarchies. VoIP Client 606 can begin sending contextual information represented in accordance with the identified structured hierarchies. In one embodiment, VoIP Client 608 starts a data binding process with respect to the contextual information. For example, instances of the identified structured hierarchies may be constructed with the received contextual information. As will be described in further detail below, the exchange of contextual information may occur when a caller is leaving a voicemail message when the VoIP client 608 provides a voicemail system. Similarly, the exchange of contextual information may occur when a callee accesses voicemail messages stored on the VoIP client 608.

Now with reference to FIGS. 7-10, aspects of the present invention that are directed at providing functionality so that a voicemail message may be "buffered" or saved as a draft will be described. Those skilled in the art and others will recognize that an Internet telephony environment 100 may include a voicemail system that allows a caller to leave an audio and/or multimodal message (e.g., audio with an electronic file) for a callee. For example, a VoIP service provider 132 may provide VoIP clients 134 with voicemail services that allow a caller to leave a voicemail message in a voice mailbox.

With existing systems, a caller is not able to save a voicemail message so the message may be subsequently modified. Instead, a caller may be required to repetitively create entirely new voicemail messages if a previously created message contains any undesirable content. Stated differently, with existing voicemail systems, a caller is not able to save a "draft" voicemail message that is capable of being modified. As a result, a caller may waste time and effort in creating new messages even in instances when modifications would be sufficient to put an existing message into the desired state.

Generally described, aspects of the present invention are directed at allowing a caller to save a voicemail message in draft form so the voicemail message may be subsequently modified. In one embodiment, a caller uses a voicemail application program to save a voicemail message in draft form. The caller may subsequently recall the draft and modify the message body and/or any associated contextual information. When modifying the body of a voicemail message, the caller may provide additional conversational data that is inserted into the draft message. Moreover, contextual information associated with a voicemail message may also be modified to, among other things, change the callee(s) who will receive the message, add/remove attached files, and the like. While the description provided below includes examples of specific user interfaces and controls, those skilled in the art and others will recognize that aspects of the present invention may be applied in other contexts than these specific examples.

Figure 7:
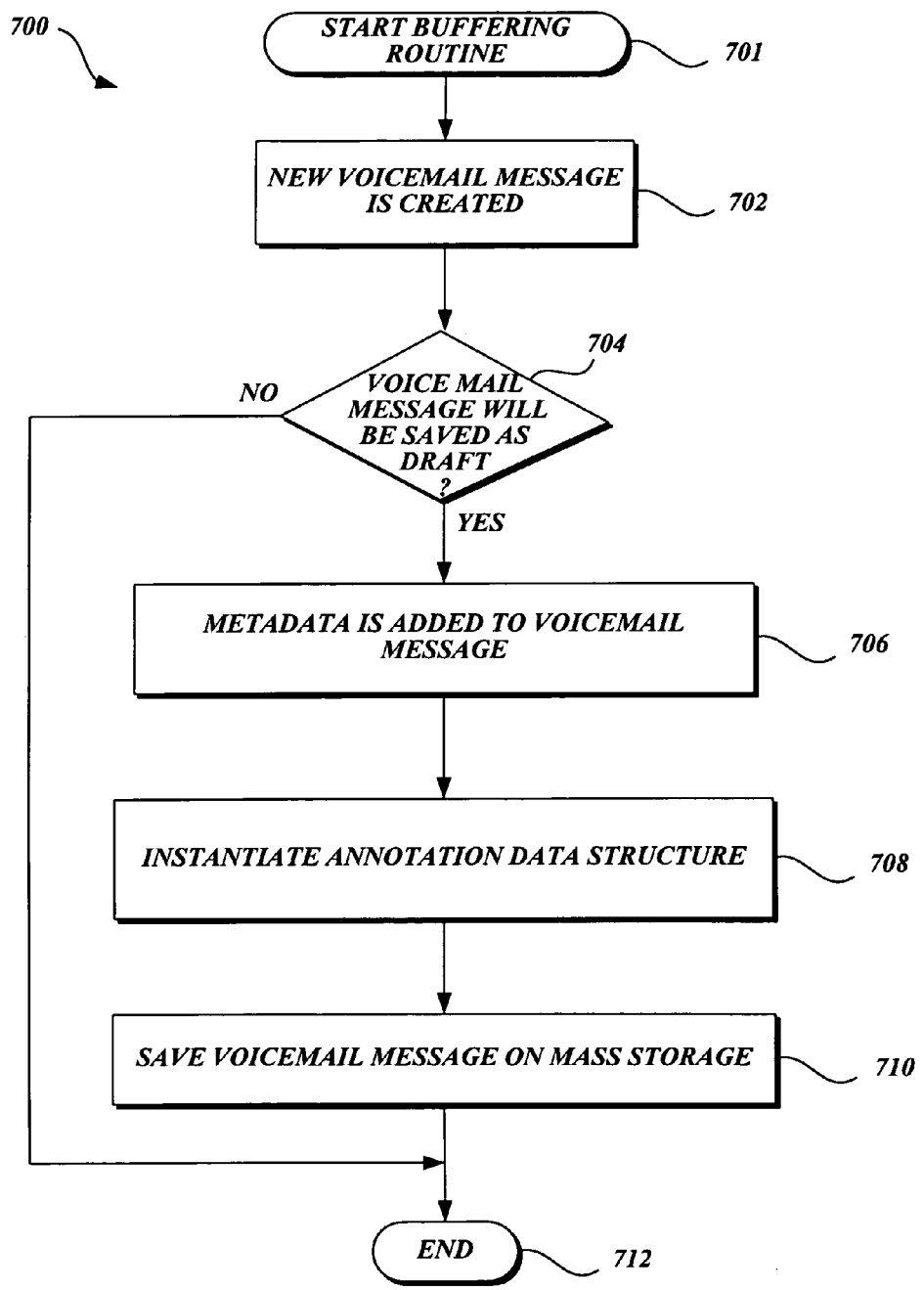
FIG. 7 is a flow diagram of a buffering routine that allows a caller to buffer or save a voicemail message as a draft.

FIG. 7 is a flow diagram of a buffering routine 700 that provides a way for a caller to save a voicemail message in draft form so that the message may be subsequently modified. In one embodiment, a service provider maintains a voicemail account on a client that is configured to store draft voicemail messages for a caller. When a caller saves or recalls a draft voicemail message, a communication channel is established between a local client associated with the caller and a remote client associated with the service provider. As mentioned previously, a communication channel may be established to transmit data between remote clients. In another embodiment, a voicemail application and/or client may provide services for storing draft voicemail messages on a local client without a communication channel being established.

As illustrated in FIG. 7, the buffering routine 700 begins at block 701 and, at block 702, a voicemail message is created. As mentioned previously, a caller may use a voicemail application program capable of capturing conversational data and, optionally, other types of data (e.g., electronic files) to create the voicemail message. In this regard, a caller may create an incomplete voicemail message that, for example, does not include required contextual information, such as the identity of the callee. However, since aspects of the present invention allow a user to create a draft voicemail message that may be modified before being delivered, an incomplete voicemail message may be created at block 702.

In an alternative embodiment, the voicemail message may be created, at block 702, without using a voicemail application program. In some voicemail systems, a caller is transferred to an audio menu managed by a service provider when an attempt to initiate a communication channel with a callee is unsuccessful. From the audio menu, a caller may use a client device that is only capable of capturing audio data, such as a POTS telephone, to create a voicemail message at block 702. In this example, the audio menu may prompt the caller regarding whether the voicemail message will be saved as a draft. While specific examples have been described, it should be well understood that a caller may create a voicemail message, at block 702, using other techniques than those described herein.

As conversational data packets that constitute the body of the voicemail message are received, at block 702, an index of the packets is generated and an electronic file ("voicemail message") is populated with the data packets and the index. As described in further detail below, the index may be referenced and updated if a caller subsequently modifies conversational data in a voicemail message. For example, one or more conversational data packets may be inserted and/or removed from a draft voicemail message. By indexing the packets, aspects of the present invention may reformat an audio stream when implementing a modification requested by a caller.

At decision block 704, a determination is made regarding whether the voicemail message created at block 702 will be saved as a draft. In one embodiment, a control accessible from a voicemail application program or client device is used to generate input to indicate that a voicemail message will be saved as a draft. In this regard, a voicemail application program or client device may include a graphical user interface ("GUI") that provides a selectable control from a menu in order to save a voicemail message as a draft. Alternatively, a client device may include a mechanical button that, when activated, saves the voicemail message as a draft. By way of another example, preferences associated with a voicemail account may dictate that all outgoing voicemail messages are buffered or saved as a draft for a predetermined period of time before being transmitted to a callee. In these examples, if a control is selected or preference established that dictates a voicemail message be saved as a draft, the buffering routine 700 determines that the result of the test performed at decision block 704 is "yes" and proceeds to block 706, described below. Conversely, if the voicemail message will not be saved as a draft, the buffering routine 700 proceeds to block 712, where it terminates.

As illustrated in FIG. 7, at block 706, metadata is added to the electronic file that contains the data packets received at block 702. As mentioned previously, contextual information associated with a voicemail message may be defined in metadata. In accordance with one embodiment, metadata is added to the electronic file, at block 706, to indicate that a voicemail message is a draft. If the draft voicemail message will be stored on a remote client, such as a client that maintains a voicemail account for the caller, the additional metadata may be organized and transmitted in accordance with an identified XML namespace. For example, the added metadata may be defined in the Call Basic Class 1102 (FIG. 11) included in a standardized structured hierarchy to facilitate the exchange of information between local and remote clients.

At block 708, the buffering routine 700 instantiates an annotation data structure. Among other things, the annotation data structure is populated with information that is used to track modifications made to the draft voicemail message. As described in further detail below, if a draft voicemail message is modified, information is added to the annotation data structure that describes the modifications made. As a result, aspects of the present invention may provide functionality for selecting between versions of a voicemail message. For example, using the information stored in the annotation data structure, controls may be provided to "undo" or "redo" modifications made to a voicemail message.

At block 710, a draft voicemail message which includes a message body, contextual information, and the annotation data structure is saved on mass storage (e.g., hard drive). Those skilled in the art and others will recognize that saving a draft voicemail message either on a local client and/or remote client may be performed, at block 710, using techniques generally known in the art. Then the buffering routine 700 proceeds to block 712, where it terminates.

Once a voicemail message is saved as a draft, a caller may access the message for many different purposes. For example, as described in further detail below with reference to FIGS. 9 and 10, a caller may modify the body of the voicemail message and/or contextual information included with the voicemail message, add additional multimode material to the voicemail message, etc. Moreover, a caller may play the body of a draft voicemail message on an audio system. In instances when the draft voicemail message is saved on a remote client, such as a service provider client that maintains a voicemail account for the caller, conversational data packets contained in the voicemail message are packetized and reassembled when communicated between the remote clients. This packetization and reassembly process that occurs when a voicemail message is "looped" through a remote client is the same that would occur if a voicemail message is sent to a callee. In this and other instances, the caller is able to listen to a draft voicemail message in the same condition as it will be when received by a callee.

Now with reference to FIG. 8, an exemplary selection user interface 800 that includes exemplary controls for accessing some of the functionality provided by the present invention will be described. In accordance with one embodiment, the selection user interface 800 includes a GUI with readily understandable controls, such as icons, scroll bars, buttons, links, menus, etc. The controls accessible from the selection user interface 800 depicted in FIG. 8 may be selected from the control region 802, the field region 804, or the identification region 806.

In this exemplary embodiment, the control region 802 presents selectable controls, commonly known as buttons, that allow a caller to, among other things, send a voicemail message to one or more callees. For example, a caller may select a voicemail message from the identification region 806 by manipulating the pointer 807. Then, by activating the "SEND" button 808, a voicemail message that was previously saved as a draft is transmitted to a callee. In one embodiment, the voicemail message may be delivered to one or more callees using typical electronic file transfer techniques. Alternatively, if a caller is communicating with a callee, the voicemail message may be transmitted to the callee using the established communication channel. In this example, the voicemail may be played to the callee (and optionally, the caller) as part of the conversation and/or stored for later retrieval by the callee.

The field region 804 identifies different categories of contextual information that may be displayed with each voicemail message presented in the identification region 806. In the exemplary selection user interface 800 depicted in FIG. 8, the field region 804 includes a "FROM" field 810, "TO" field 812, "STATUS" field 814, and "SUBJECT" field 816. Each voicemail message accessible from the identification region 806 presents this contextual information to a caller, if the information is available. However, the fields 810, 812, 814, and 816 depicted in FIG. 8 should be construed as exemplary and other types of contextual information may be presented to a caller. For example, a caller may define preferences to display the importance of a voicemail message, any file attachments, and the like. Moreover, fewer or additional fields may be presented to a caller than those on the selection user interface 800 depicted in FIG. 8.

Figure 8:
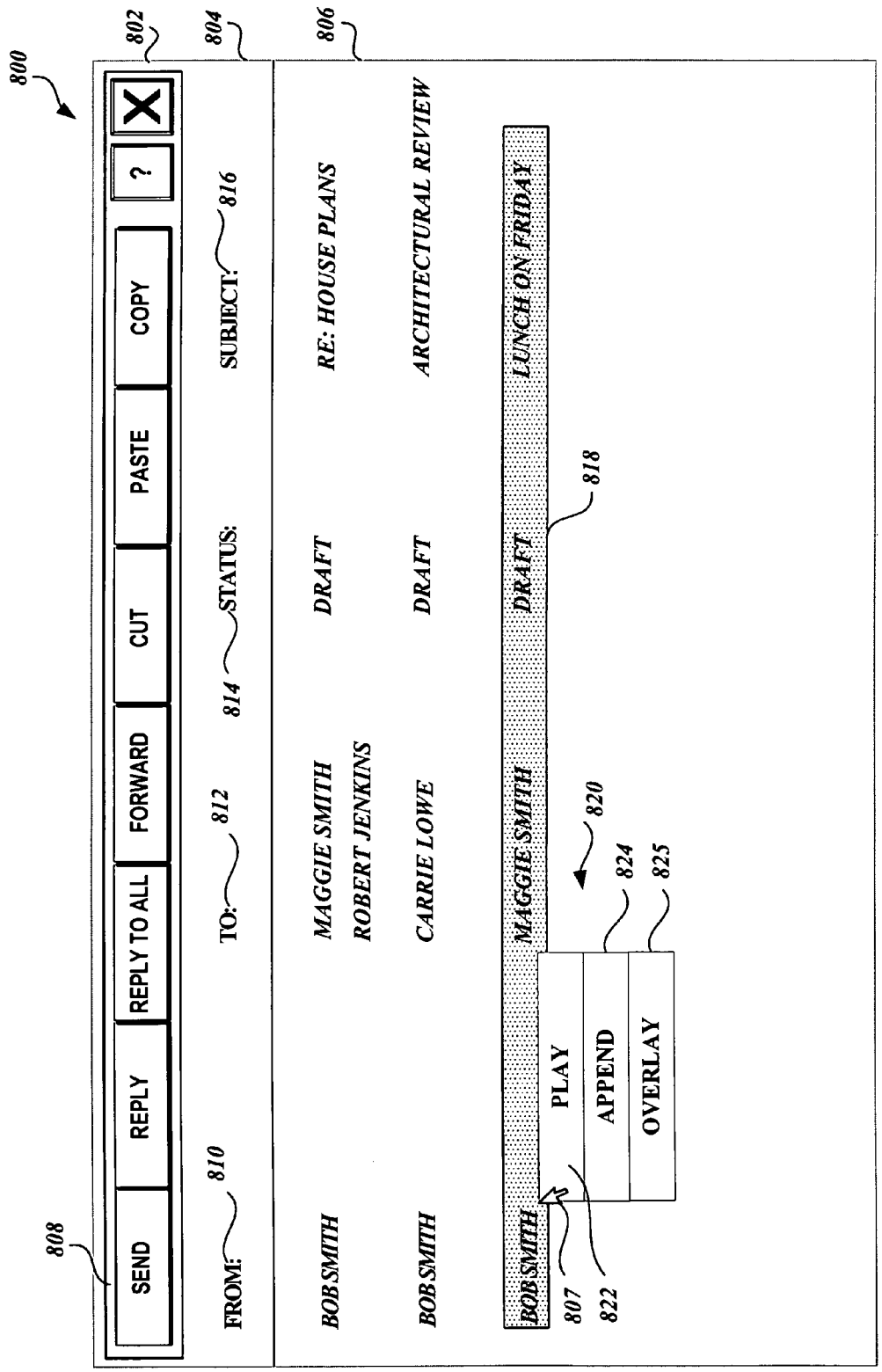
FIG. 8 is a pictorial depiction of an exemplary selection user interface suitable to interact with a caller and obtain event data.

In the exemplary selection user interface 800 depicted in FIG. 8, the identification region 806 includes entries that represent three (3) draft voicemail messages. In accordance with one embodiment, a user may generate a voicemail selection event from the selection user interface 800. For example, a caller may "double-click" on a voicemail entry represented on the identification region 806. In response, an edit user interface 1000 (FIG. 10) may be presented that accepts input to modify the selected draft voicemail message. Further description of the ways in which a draft voicemail message may be modified from the edit user interface 1000 is described below.

From the selection user interface 800, controls for playing, appending, and/or multiplexing data to a voicemail message may also be accessed. In the example depicted in FIG. 8, a caller selects a voicemail message by "right-clicking" on the area of selection region 806 occupied by the entry 818. In response, a pop-up menu 820 is displayed that includes, in this example, a "PLAY" menu item 822, an "APPEND" menu item 824, and a "OVERLAY" menu item 825. By selecting the "PLAY" menu item 822, a caller issues a command to listen to the body of a voicemail message. As mentioned previously, the voicemail may be "looped" through a remote client so that the message may be played in the same condition as would be received by a callee.

By selecting the "APPEND" menu item 824, a caller issues a command to add additional conversational data or other multimodal information to the body of the selected draft voicemail message. As mentioned previously, any one of a number of systems and devices may be used to capture conversational data from a caller when a voicemail message is created. Similarly, the same systems and devices may also be used to obtain additional conversational data that a caller desires to add to a voicemail message when the "APPEND" menu item 824 is selected.

When the "APPEND" menu item is selected and a caller inputs additional conversational data, the additional conversational data is added to the draft voicemail message. In this way, the "APPEND" menu item 824 provides an easy and convenient way for a caller to clarify certain points, provide additional detail, and the like to an existing voicemail message without being required to create an entirely new message. In accordance with one embodiment, any additional conversational data is sequentially appended to the end of the draft voicemail message. However, the additional conversational data may be added to the beginning or middle of a voicemail message without departing from the scope of the claimed subject matter. As described below with respect to FIG. 10, conversational data may also be included within the voicemail message.

By selecting the "OVERLAY" menu item 825, the caller may identify an electronic file that will be multiplexed with the body of the selected voicemail message. For example, when the "OVERLAY" menu item 825 is selected, a caller may browse a file system accessible from the client and identify an electronic file that will be multiplexed with the selected voicemail message to provide "background music." The selected audio file and draft voicemail message are transmitted in the form of the single multiplexed data stream that is recovered by the receiving client.

Now with reference to FIG. 9, a modification routine 900 that modifies a voicemail message based on input received from a caller will be described. The modification routine 900 begins at block 902 and, at block 904, a caller selects a voicemail message. As mentioned previously, a caller may select a voicemail message by interacting with a user interface, such as the selection user interface 800 described above with reference to FIG. 8. However, those skilled in the art and others will recognize that a voicemail message may be selected in other ways and this example should be construed as exemplary and not limiting. In response to a voicemail message being selected, the modification routine 900 presents an edit user interface 1000 to the caller, at block 905. Among other things, the edit user interface 1000 provides controls for playing, inserting, overwriting, and/or deleting conversational data in the selected voicemail message. Moreover, the edit user interface 1000 provides controls for modifying the contextual information that is associated with the selected voicemail message.

Figure 10:
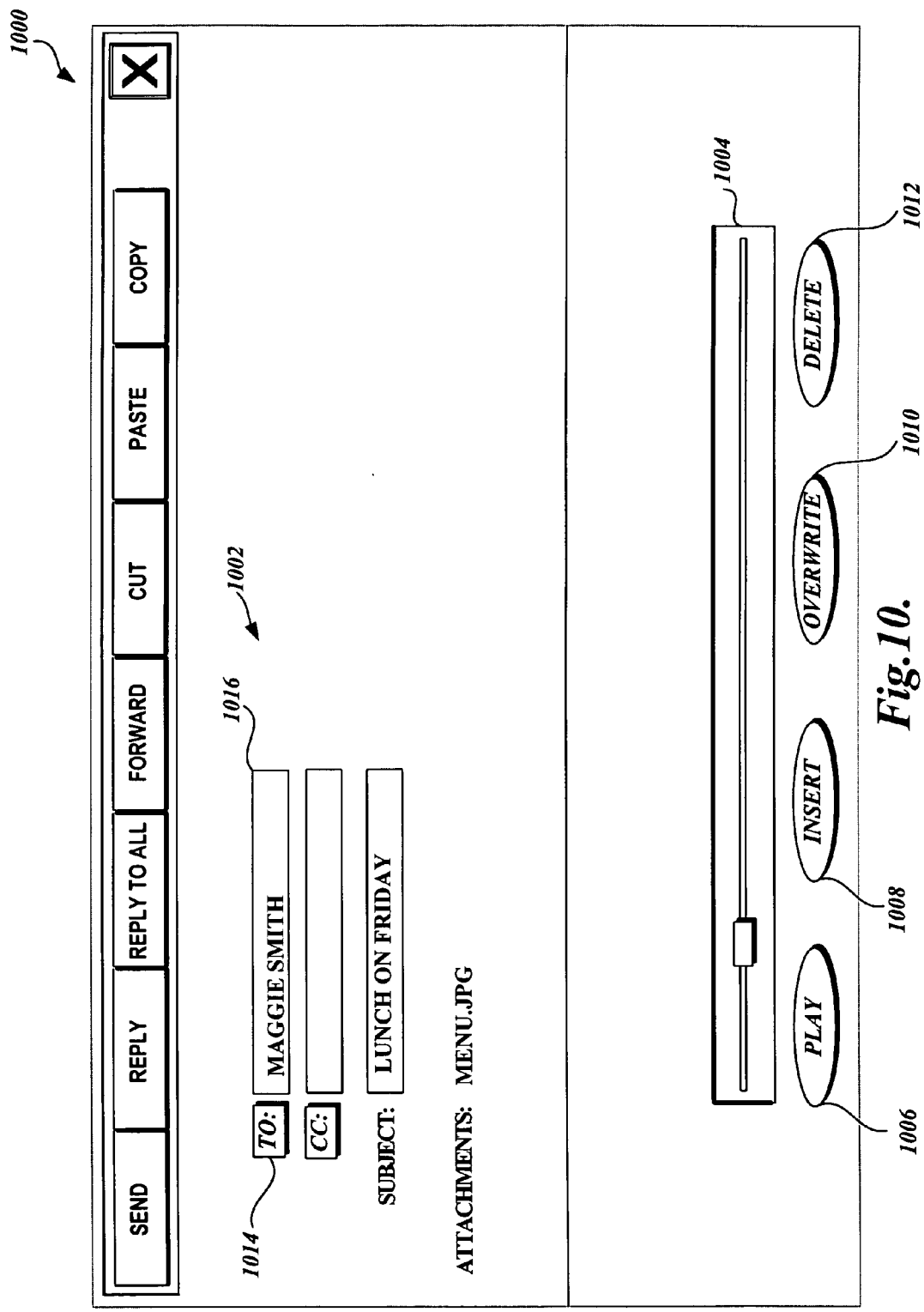
FIG. 10 is a pictorial depiction of an edit user interface suitable to obtain event data from a caller that describes how a voicemail message will be modified.
Figure 11:
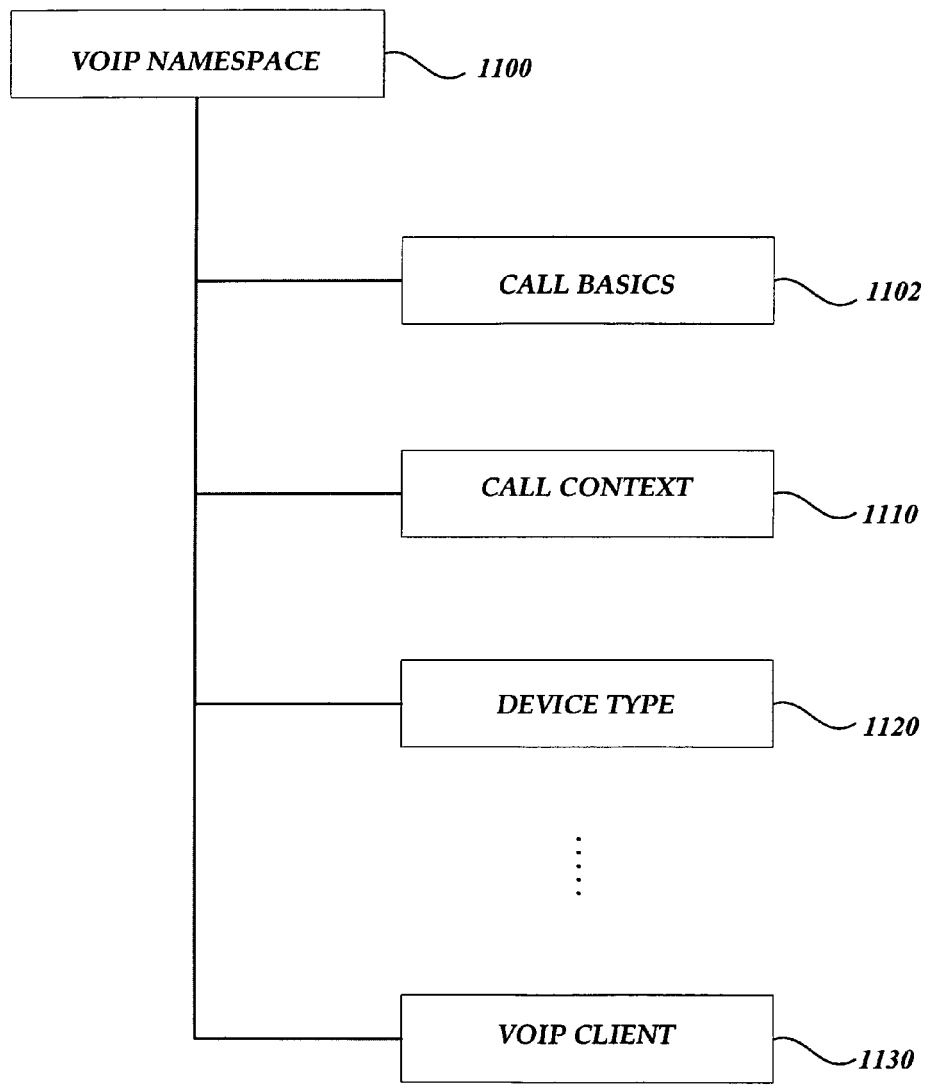
FIGS. 11-15 are block diagrams illustrative of various attribute and classes of structured hierarchies corresponding to VoIP contextual information in accordance with an aspect of the present invention.

For illustrative purposes and by way of example only, an exemplary edit user interface 1000 is depicted in FIG. 10. Similar to the description provided above with reference to FIG. 8, the edit user interface 1000 provides readily understandable controls for accepting input and otherwise interacting with a caller. More specifically, the edit user interface 1000 depicted in FIG. 10 includes a header region 1002, a progress bar 1004, and a plurality of selectable controls associated with the progress bar 1004, including a "PLAY" button 1006, an "INSERT" button 1008, an "OVERWRITE" button 1010, and a "DELETE" button 1012.

In the header region 1002, different categories of contextual information associated with the selected voicemail message are presented. In this regard, the header region 1002 includes a "TO" button 1014 and an associated editable textbox 1016. The textbox 1016 identifies the callee(s) who are currently designated to receive the selected voicemail message. One way that a caller may modify a message's callee(s) is by activating the "TO" button 1014 to access a database, commonly known as an address book, that stores information about a caller's "contacts." From the address book, a caller may select a contact that will be added as a callee to the voicemail message. Similarly, a caller may identify contacts who will be provided with a "carbon copy" of the selected voicemail message using similar techniques. Also, a caller may modify other contextual data associated with a selected voicemail message by providing text-based input into the editable text boxes available from the edit user interface 1000. Alternatively, speech recognition software may be utilized to convert audio into text for inclusion as the subject. Moreover, the voicemail message may be processed using similar speech recognition technology in an effort to automatically determine the subject. Upon determination, the subject field may be populated. Through interaction with the header region 1002, the subject, automatically populated or manually provided, may be modified by the caller. For example, a caller may change text that is included in the subject line of the voicemail message and select an enter key from a keyboard to generate an event that modifies this contextual information.

Moreover, from the edit user interface 1000, file attachments that will be included with the voicemail message may be added/removed as needed. In this regard, the user interface 1000 allows the user to browse a file system accessible from the client and select an electronic file that will be included with the voicemail message as an attachment. In one embodiment, instructions for presenting an attachment to a callee are automatically generated when the attachment is selected. For example, from the edit user interface 1000, a caller may cause a draft voicemail message to be played on the audio system of a client by activating the "PLAY" button 1006. While the draft voicemail message is being played, a word processing document, spreadsheet, PowerPoint® presentation, database, or other type of electronic file may be added as an attachment to the draft voicemail message. In response, a "tag" or segment of text that provides instructions for presenting the attachment is added as metadata to the voicemail message. The instructions may cause the attachment to be presented to the callee when the location where the attachment was added to the voicemail message is reached during playback. Also, the instructions may cause a particular application program (e.g., Microsoft Word®) to be launched so the attachment may be immediately presented to the callee. Alternatively, the instructions may notify a callee when the location where the attachment was added is reached so the attachment may be manually accessed. In this regard, a tag which conforms to the XML or other markup format may be used to describe the semantics of presenting the data item to the callee. Moreover, a caller may select an electronic file that will be multiplexed with the body of the selected voicemail message. For example, similar to the description provided above with reference to FIG. 8, a menu item accessible from the user interface 1000 may be provided to overlay an electronic file with the body of selected voicemail message.

The progress bar 1004 depicted in FIG. 10 provides dynamic visual updates regarding the extent to which a data stream included in the body of a voicemail message has been played. From the edit user interface 1000, a caller may cause a draft voicemail message to be played on the audio system of a client by activating the "PLAY" button 1006. Modifications to the voicemail message may be accepted as the message is being played. In this regard and as described in further detail below, the caller may modify the body of the voicemail message using the "INSERT" button 1008, the "OVERWRITE" button 1010, or the "DELETE" button 1012. Also, an attachment may be inserted into the voicemail message along with instructions for presenting the attachment. As mentioned previously, the location where the attachment is inserted is preserved. As a result, the attachment may be presented to the callee during playback at a location selected by the caller.

As the body of a draft voicemail message is being played, a caller may activate/deactivate the "INSERT" button 1008, the "OVERWRITE" button 1010, or the "DELETE" button 1012. While the "INSERT" button 1008 or "OVERWRITE" button 1010 are activated, additional conversational data is obtained that will be added to the voicemail message. More specifically, when the "INSERT" button 1008 is activated, additional conversational data is obtained that is inserted into the body of a message at a location designated by the caller. When the "OVERWRITE" button 1010 is activated, additional conversational data replaces conversational data previously included in the draft voicemail message. Similarly, the conversational data that is played while the "DELETE" button 1012 is activated is removed from the draft voicemail message.

While a specific example of an exemplary edit user interface 1000 has been described above with reference to FIG. 10, those skilled in the art and others will recognize that the features provided by the present invention may be implemented using a different type of interface. For example, the edit user interface 1000 does not have to be a GUI, but may be rendered as a text display without the graphical components illustrated in FIG. 10, provided via audio prompts, etc. Thus, the example provided above should be construed as exemplary and not limiting.

Returning now to FIG. 9, at decision block 906, the modification routine 900 remains idle until a caller generates a draft voicemail modification event. For example, while the edit user interface 1000 is displayed, a caller may generate one or more events to modify the message body or contextual information that is associated with the draft voicemail message. In accordance with one embodiment, when the user generates an event from the edit user interface 1000, the modification routine 900 receives notice of the event that includes a set of event data.

At decision block 908, a determination is made regarding whether the event received at block 906 is directed at accessing controls to modify the body of a voicemail message. Those skilled in the art and others will recognize that in modern computing devices, an operating system manages input/output ("I/O") generated by application programs. In this regard, the types of events that may be generated from the edit user interface 1000 are satisfied in separate event handlers. Thus, when a control presented on the edit user interface 1000 is activated, an operating system receives notice of the event and calls the appropriate event handler. If the event handler called at block 906 is associated with the "PLAY" button 1006, then a determination is made that the event is directed at accessing controls to modify the body of a draft voicemail message and the modification routine 900 proceeds to block 910. Conversely, if the event received at block 906 is directed at modifying contextual information that is associated with a voicemail message, the modification routine 900 proceeds to block 918, described in further detail below.

Figure 9:
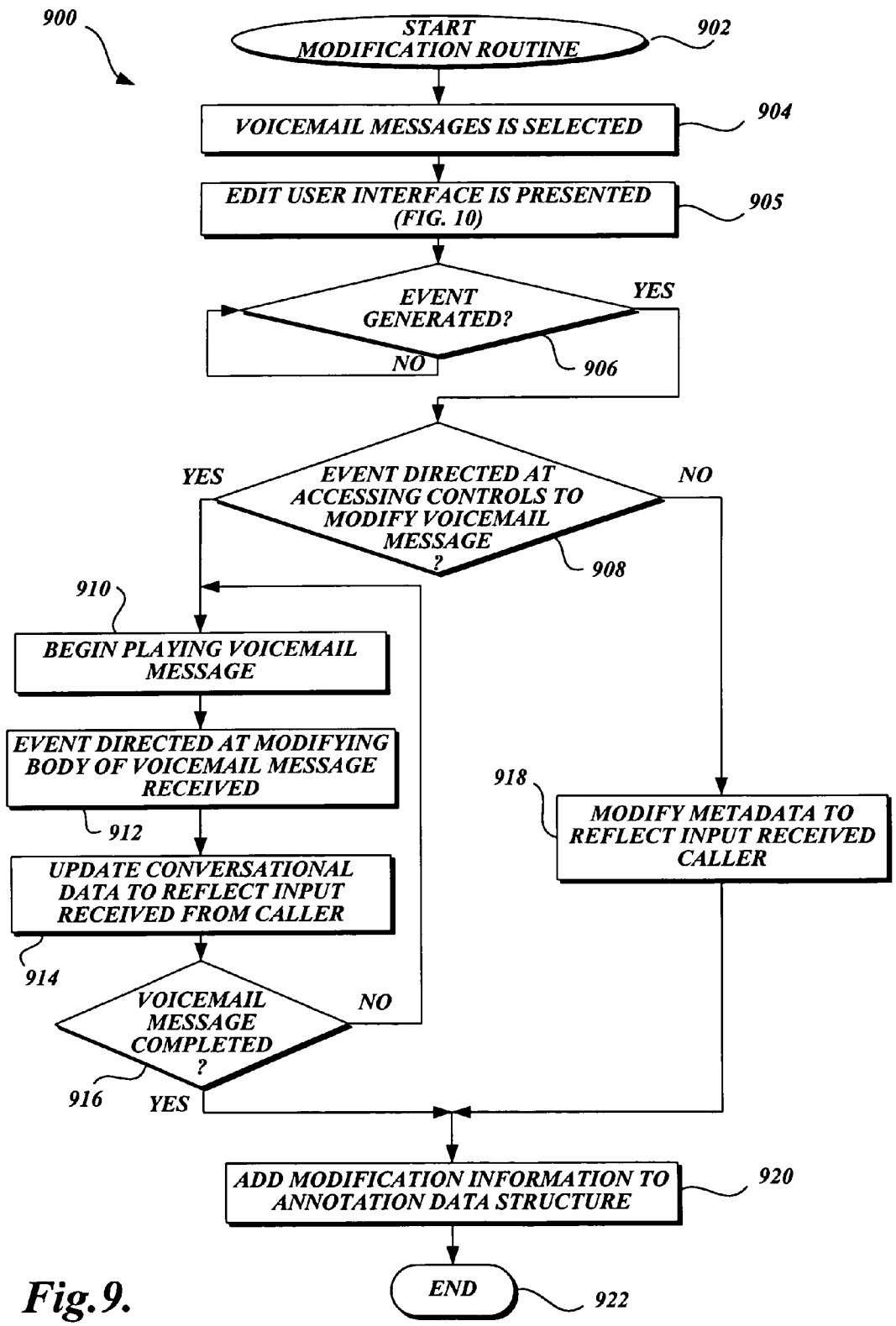
FIG. 9 is a flow diagram of a modification routine for modifying a voicemail message based on input received from a caller.

As illustrated in FIG. 9, at block 910, the modification routine 900 begins playing a selected voicemail message. If block 910 is reached, an event directed at accessing controls to modify a voicemail message was generated, when, for example, a caller activated the "PLAY" button 1006. Any type media player program accessible from client devices may be used to play a voicemail message. As the caller is listening to the voicemail message, an additional event that is directed at modifying the body of the message may be generated. For example, a caller may generate this type of event, at block 912, by activating either the "INSERT" button 1008, the "OVERWRITE" button 1010, or the "DELETE" button 1012 from the edit user interface 1000 (FIG. 10). Similar to the description provided above, when one of these controls is activated, the modification routine 900 receives a set of event data that may include, but is not limited to, the identity of the activated control, the index positions of the corresponding conversational data packets in the voicemail message where the control was activated/deactivated, and any additional conversational data input by the caller. Also, as the caller is listening to the voicemail message, an additional event that is directed at modifying the contextual information included with a voicemail message may be generated. For example, an attachment may be added to a voicemail message while the voicemail message is being played. In this instance, instructions for presenting the attachment to a callee are also included with the voicemail message. Similar to the description provided below with reference to block 918, the semantics of presenting the attachment may be included in the voicemail message in a tag that is stored as metadata.

As illustrated in FIG. 9, at block 914, the modification routine 900 updates the conversational data included with the body of voicemail message to reflect the input received from the caller. Generally described, the update performed at block 914 includes reformatting a conversational data stream based on the event data received at block 912. In accordance with one embodiment, different actions may be performed at block 914 depending on the input received from the caller. In the description below, specific examples that describe how the body of a voicemail message may be updated to reflect input received from a caller are described. However, the examples provided below are exemplary and should not be construed as limiting.

As mentioned previously, when the "INSERT" button 1008 is activated, additional conversational data received from the caller is inserted into the body of a voicemail message without removing conversational data previously included in the voicemail message. As mentioned previously, the position of conversational data packets included with a voicemail message are indexed. Thus, additional conversational data packets may be inserted into a draft voicemail message, at block 914, by identifying the index position that corresponds to the location where the "INSERT" button 1008 was activated. The additional conversational data packets received from the caller are assigned sequentially higher index positions from this location. To complete the update, at block 914, packets in the draft voicemail message with originally higher index positions from the location where the "INSERT" button 1008 was activated are reassigned index positions starting from the last index position that was "inserted."

In one exemplary embodiment, when the "OVERWRITE" button 1010 is activated/deactivated, additional conversational data received from the caller replaces conversational data originally included in a voicemail message. To perform the update at block 914, in this example, additional conversational data packets are added to the body of a voicemail message by identifying the locations or index positions where the "OVERWRITE" button 1010 was activated and deactivated. The additional conversational data packets obtained from the caller are assigned index positions that are between these locations. To complete the update at block 914, conversational data packets that were previously assigned the index positions between these identified locations are removed from the voicemail message.

In the exemplary embodiment in which the "DELETE" button 1012 is activated, additional conversational data is not obtained from the caller. In this instance, the index positions of the conversational data packets that correspond to the locations where the "DELETE" button 1012 was activated and deactivated are removed from the voicemail message, at block 914. Then, to complete the update, conversational data packets that are subsequent to the location where the "DELETE" button 1012 was deactivated are reassigned index positions that start from the location where the "DELETE" button 1012 was activated.

As illustrated in FIG. 9, at decision block 916, the modification routine 900 determines whether the stream of data in the body of a voicemail message is still being played. In accordance with one exemplary embodiment, events that are directed at modifying the body of a voicemail message are received as a caller listens to a draft of the message. Using techniques that are generally known on the art, at block 916, the modification routine 900 determines whether the draft voicemail message has completed. If the result of the test performed at block 916 is "yes," the modification routine 900 proceeds to block 920 described in further detail below. Conversely, if the result of the test is "no," then the modification routine 900 proceeds back to block 910 and blocks 910 through 916 repeat until the draft voicemail is no longer being played.

As illustrated in FIG. 9, at block 918, the modification routine 900 modifies the metadata included with a voicemail message to reflect the input received from the caller. If block 918 is reached, a determination was made at block 908 that the caller generated an event to modify the contextual information that is associated with a voicemail message. For example, while the edit user interface 1000 is displayed, a caller may generate an event to add/remove file attachments, change the callee(s), add/remove text in the subject line, and the like. As mentioned previously, contextual information associated with a voicemail message may be defined in metadata. In accordance with one embodiment, the modification routine 900 uses event data received a block 906 to update a voicemail message's metadata, at block 918, to reflect input received from the caller. Moreover, the metadata included with the voicemail message may be communicated between remote clients in accordance with the structured hierarchies described below with reference to FIGS. 11-15.

When a caller modifies a voicemail message, a log of the modifications performed is captured in a record that includes technical modification information. At block 920, technical modification information contained in the record is appended to the annotation data structure. The technical modification information may include unique IDs for each modification performed, pointers to conversational data received and/or discarded as a result of a modification, and the like. By recording the technical modification information in the annotation data structure, functionality may be provided to "undo" or "redo" any modifications to a voicemail message made by a caller. When a voicemail message is transmitted to a callee, records of technical modification information stored in the annotation data structure may be removed from the voicemail message and/or any attachments. Then the modification routine 900 proceeds to block 922, where it terminates.

With reference to FIGS. 11-15, block diagrams illustrative of various classes and attributes of structured hierarchies corresponding to VoIP contextual information are shown. The VoIP contextual information exchanged between various VoIP entities (e.g., clients, service providers, etc.) may correspond to a VoIP namespace 1100. In one embodiment, the VoIP namespace 1100 is represented as a hierarchically structured tree of nodes, each node corresponding to a subclass which corresponds to a subset of VoIP contextual information. For example, a VoIP Namespace 1100 may be defined as a hierarchically structured tree comprising a Call Basics Class 1102, a Call Contexts Class 1110, a Device Type Class 1120, a VoIP Client Class 1130 and the like.

Figure 12:
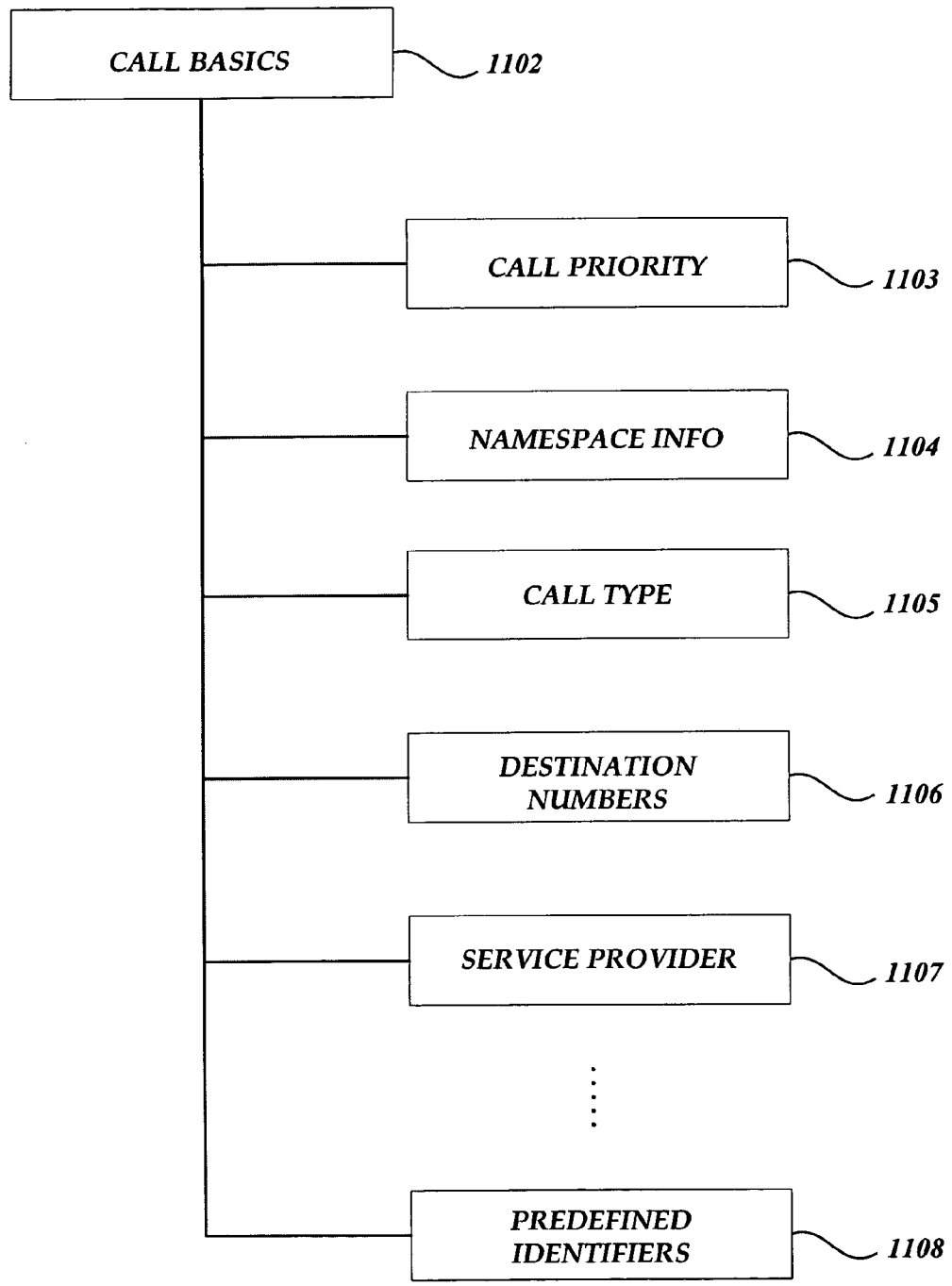

With reference to FIG. 12, a block diagram of a Call Basics Class 1102 is shown. In an illustrative embodiment, Call Basics Class 1102 may correspond to a subset of VoIP contextual information relating to a conversation channel connection (e.g., a PSTN call connection, a VoIP call connection, and the like). The subset of the VoIP contextual information relating to a conversation channel connection may include originating numbers (e.g., a caller's VoIP ID number), destination numbers (e.g., callees' VoIP ID numbers or telephone numbers), call connection time, VoIP service provider related information, and/or ISP related information such as IP address, MAC address, namespace information and the like. Additionally, the contextual information relating to a conversation channel connection may include call priority information (which defines the priority levels of the destination numbers), call type information, and the like. The call type information may indicate whether the conversation channel is established for an emergency communication, a broadcasting communication, a computer to computer communication, a computer to POTS device communication, a connection for leaving a voicemail message, and so forth. In one embodiment, the contextual information relating to a conversation channel connection may include predefined identifiers, which indicate whether a voicemail message is being received that is being saved as a "draft." A Call Basics Class 1102 may be defined as a sub-tree structure of a VoIP Namespace 1100, which includes nodes such as call priority 1103, namespace information 1104, call type 1105, destination numbers 1106, service provider 1107, predefined identifiers 1108, and the like.

Figure 13:
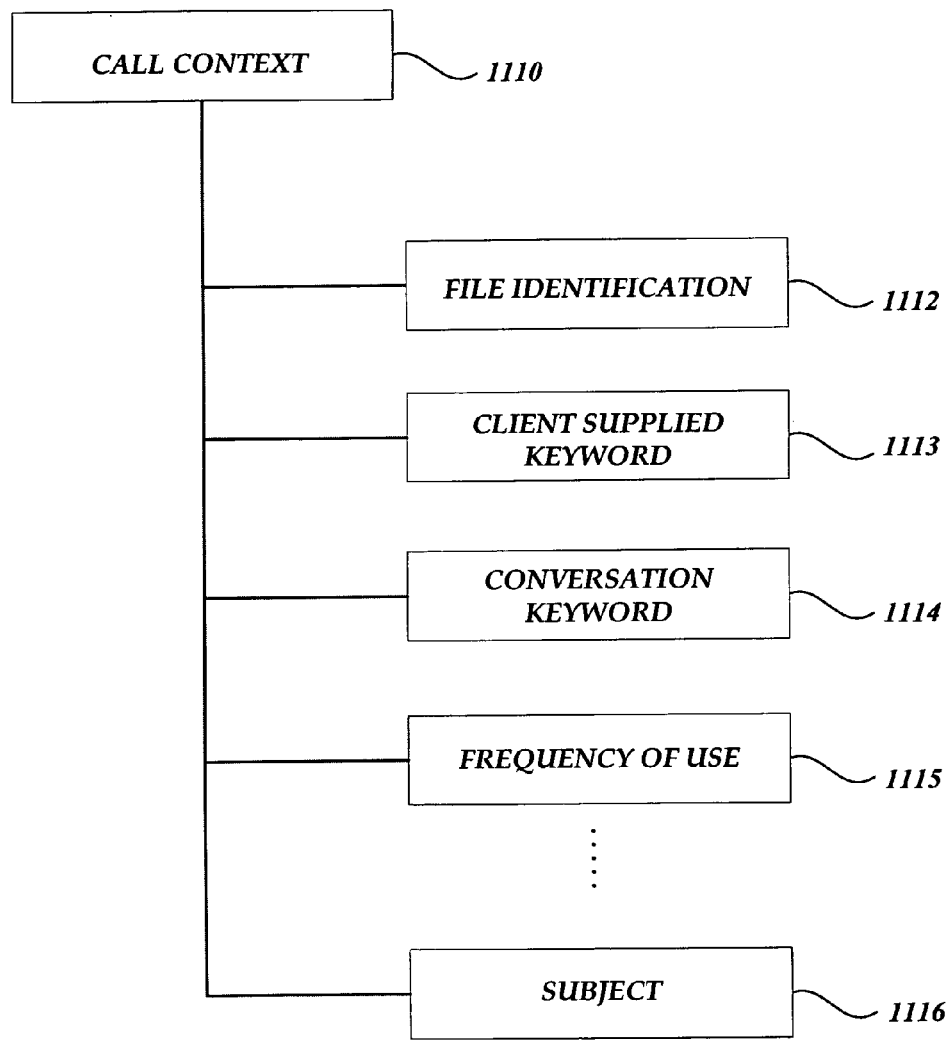

With reference to FIG. 13, a block diagram of a Call Contexts Class 1110 is shown. In one embodiment, a subset of VoIP contextual information relating to conversation context may correspond to the Call Contexts Class 1110. The contextual information relating to conversation context may include information such as client supplied keywords, annotations made to a voicemail message, identified keywords from document file data, identified keywords from a conversation data packet (e.g., conversation keywords), file names for documents and/or multimedia files exchanged as part of the conversation, game related information (such as a game type, virtual proximity in a certain game), frequency of use (including frequency and duration of calls relating to a certain file, a certain subject, and a certain client), and file identification (such as a case number, a matter number, and the like relating to a conversation), among many others. In accordance with an illustrative embodiment, a Call Contexts Class 1110 may be defined as a sub-tree structure of a VoIP Namespace 1100, which includes nodes corresponding to file identification 1112, client supplied keyword 1113, conversation keyword 1114, frequency of use 1115, subject of the conversation 1116, and the like.

Figure 14:
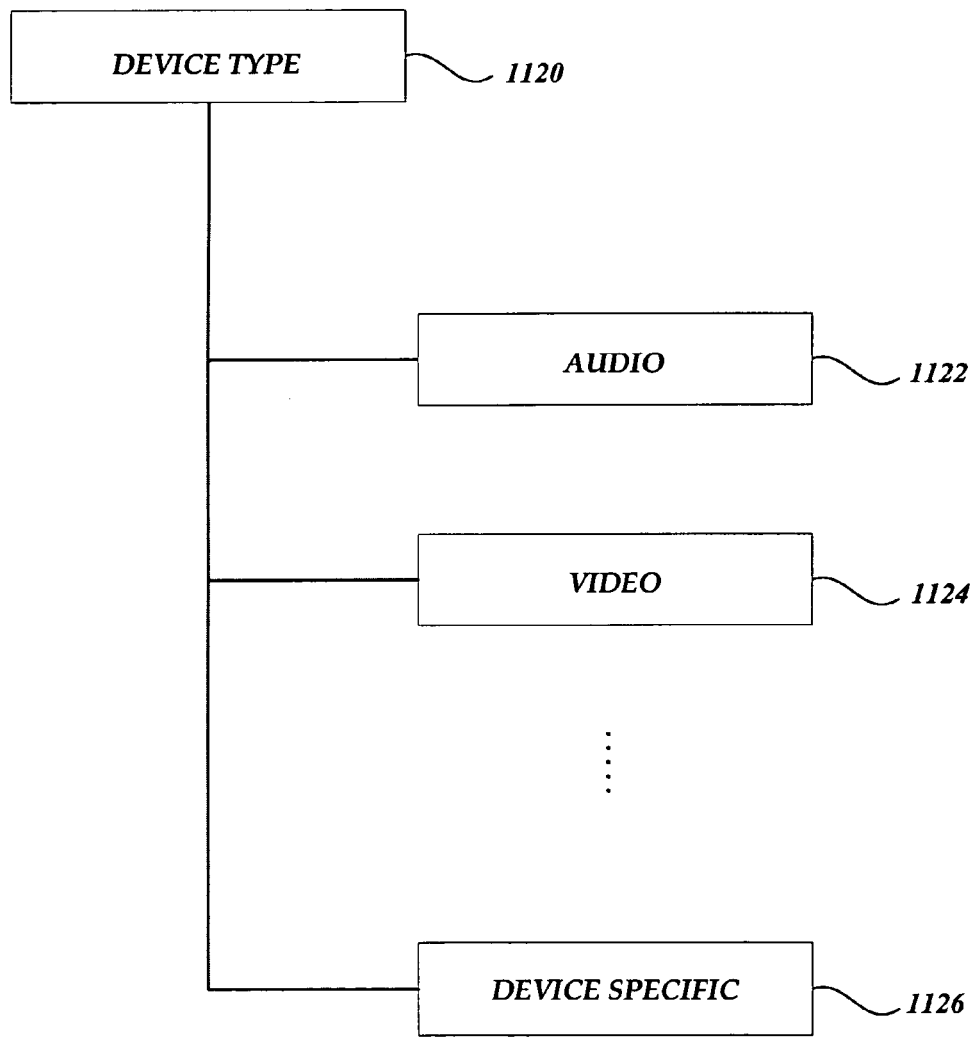

With reference to FIG. 14, a block diagram of a Device Type Class 1120 is depicted. In one embodiment, a Device Type Class 1120 may correspond to a subset of VoIP contextual information relating to a VoIP client device used for the conversation channel connection. The subset of the VoIP contextual information relating to the VoIP client device may include audio related information, which may be needed to process audio data generated by the VoIP client device. The audio related information may include information related to the device's audio functionality and capability, such as sampling rate, application programs installed for using the device's audio functionality, machine type, output/input type, microphone, Digital Signal Processing (DSP) card information, and the like. The subset of the VoIP contextual information relating to the VoIP client device may include video related information, which may be needed to process video data generated by the VoIP client device. The video related information may include resolution, refresh, type, and size of the video data, graphic card information, and the like. The contextual information relating to VoIP client devices may further include other device specific information such as a type of the computer system, processor information, network bandwidth, wireless/wired connection, portability of the computer system, processing settings of the computer system, and the like. In an illustrative embodiment, a Device Type Class 1120 may be defined as a sub-tree structure of a VoIP Namespace 1100, which includes nodes corresponding to Audio 1122, Video 1124, Device Specific 1126 and the like.

Figure 15:
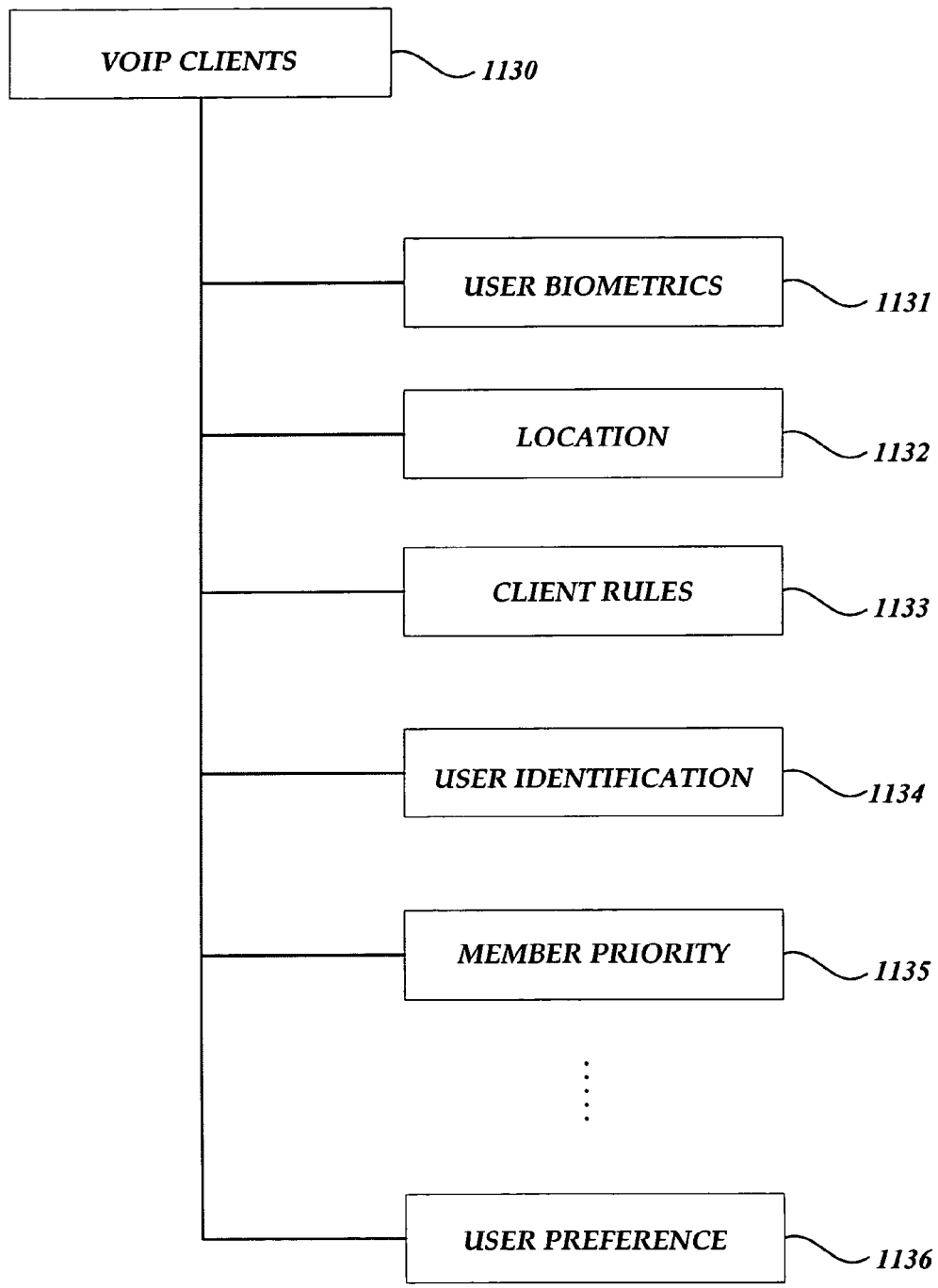

With reference to FIG. 15, a block diagram of a VoIP Client Class 1130 is depicted. In accordance with an illustrative embodiment, a VoIP Client Class 1130 may correspond to a subset of contextual information relating to VoIP clients. In one embodiment, the subset of the VoIP contextual information relating to the VoIP client may include voice profile information (e.g., a collection of information specifying the tonal and phonetic characteristics of an individual user), digital signature information, and biometric information. The biometric information can include user identification information (e.g., fingerprint) related to biometric authentication, user stress level, user mood, etc. Additionally, the subset of the VoIP contextual information relating to the VoIP client may include location information (including a client defined location, a VoIP defined location, a GPS/triangulation location, and a logical/virtual location of an individual user), assigned phone number, user contact information (such as name, address, company, and the like), rules defined by the client, user preferences including application programs for processing voicemail messages, digital rights management (DRM), a member rank of an individual user in an organization, priority associated with the member rank, and the like. In one embodiment, a VoIP Client Class 1130 may be defined as a sub-tree structure of a VoIP Namespace 1100, which includes nodes corresponding to user biometrics 1131, location 1132, client rules 1133, user identification 1134, member priority 1135, user preference 1136, and the like.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a digital voice communication environment that includes a client device capable of capturing conversational data from a caller, a method of saving a voicemail message as a draft, the method comprising:
   forwarding the caller to a voicemail system associated with a callee after attempting to establish a conversation channel between the caller and the callee;
   receiving a voicemail message from the caller using the voicemail system associated with the callee without delivering the voicemail message from the caller to the callee;
   receiving input from the caller to save the voicemail message as a draft in the voicemail system associated with the callee such that the voicemail is not delivered to the callee for access;
   associating contextual information with the voicemail message that indicates the voicemail message is a draft; wherein the voicemail message comprises conversational data packets and contextual data packets; wherein the contextual data packets are used to store the contextual information that indicates the voicemail message is the draft; wherein the contextual information is not in an audio-based format;
   storing the voicemail message as the draft using the voicemail system associated with the callee without delivering the voicemail to the callee such that the callee is unable to access the voicemail message; and
   in response to receiving a selection to send the saved draft of the voicemail message, delivering the voicemail message to the callee such that the callee is able to access the voicemail message.

2. The method as recited in claim 1, further comprising:
   receiving input from the caller to modify the body of the voicemail message; and
   updating the conversational data in the body of the voicemail message to reflect the input received from the caller.

3. The method as recited in claim 2, wherein the voicemail message may be saved on a remote client that maintains a voicemail account for the caller; and
   wherein causing the voicemail message to be stored includes transmitting the voicemail message to the remote client.

4. The method as recited in claim 1, further comprising:
   looping the voicemail message through a remote client; and
   playing the voicemail message on the client device.

5. The method as recited in claim 1, wherein the input received from the caller to save the voicemail message as a draft is obtained from an audio menu.

6. The method as recited in claim 1, wherein receiving input from the caller to save the voicemail message as a draft includes configuring a voicemail application program to accept input from a caller for saving a voicemail message in draft form.

7. The method as recited in claim 1, wherein associating contextual information with the voicemail message that indicates that the voicemail message is a draft includes adding metadata to an electronic file.

8. A tangible computer-readable medium containing computer-readable instructions which, when executed in a client that is configured to obtain input from a caller, performs a method of modifying the data included with a draft voicemail message, the method comprising:
   connecting to a voicemail system that is configured to store voicemail messages for a callee including voicemail messages that are marked as drafts that are not delivered to the callee and created by a caller that is not a callee;

providing a user interface where the caller may generate an event for modifying the draft voicemail message including controls comprising: a play control used to play the voicemail message, an insert control that when selected obtains additional conversational data that is inserted into the voicemail message at a location designated by the caller, an overwrite control that when activated replaces conversational data previously included in the voicemail message with additional conversational data, a delete control that when activated removes conversational data from the voicemail message when activated; an address control that when selected allows recipients of the voicemail message to be changed; and a send control that when selected delivers the voicemail message to the callee such that the callee is able to access the voicemail message, wherein the voicemail message comprises conversational data packets and contextual data packets; wherein the contextual data packets are used to store the contextual information;

receiving event data that describes a modification to the draft voicemail message requested by the caller;

updating the data included with the draft voicemail message to reflect the event generated by the caller;

receiving a selection to send the draft of the voicemail message that is stored in the voicemail system of the callee to the caller; and delivering the voicemail message to the callee such that the callee is able to access the voicemail message.

9. The computer-readable medium as recited in claim 8, further comprising adding modification information to a data structure that describes the modification performed as a result of the event generated by the caller.

10. The computer-readable medium as recited in claim 8, wherein providing a user interface where the caller may generate an event to modify a draft voicemail message includes configuring a voicemail application program with selectable controls to obtain input from the caller that describes a desired modification comprising an overlay control that when activated, the caller identifies an electronic file that is multiplexed with the voicemail message.

11. The computer-readable medium as recited in claim 8, wherein updating the data included with the draft voicemail message includes inserting conversational data packets obtained from the caller between conversational data packets originally included in the draft voicemail message.

12. The computer-readable medium as recited in claim 8, wherein updating the data included with the draft voicemail message includes modifying conversational data packets originally included in the draft voicemail message with additional data.

13. The computer-readable medium as recited in claim 8, wherein updating the data included with the draft voicemail message to reflect the event generated by the caller includes assigning index positions to conversation data packets in the draft voicemail message.

14. The computer-readable medium as recited in claim 8, wherein updating the data included with the draft voicemail message to reflect the event generated by the caller includes: inserting instructions for presenting a file attachment in the voicemail message; and wherein the instructions cause the attachment to be presented to the callee at a location selected by the caller.

15. The computer-readable medium as recited in claim 8, wherein updating the data included with the draft voicemail message to reflect the event generated by the caller includes:

playing at least a portion of the voicemail message; and accepting an event to modify conversational data in the body of the draft voicemail message while the draft voicemail message is playing.

16. The computer-readable medium as recited in claim 8, wherein updating the data included with the draft voicemail message to reflect the event generated by the caller includes modifying contextual information that is associated with the draft voicemail message.

17. The computer-readable medium as recited in claim 16, wherein the contextual information is defined in accordance with a structured hierarchy.

18. A system, comprising:

a processor and a tangible computer readable medium, the processor configured to perform actions comprising:

forwarding the caller to a voicemail system associated with a callee after attempting to establish a conversation channel between the caller and the callee;

receiving a voicemail message from the caller using the voicemail system associated with the callee without delivering the voicemail message from the caller to the callee;

receiving input from the caller to save the voicemail message as a draft in the voicemail system associated with the callee such that the voicemail is not delivered to the callee for access;

associating contextual information with the voicemail message that indicates the voicemail message is a draft; wherein the voicemail message comprises conversational data packets and contextual data s packets; wherein the contextual data packets are used to store the contextual information that indicates the voicemail message is the draft; wherein the contextual information is not in an audio-based format;

storing the voicemail message as the draft using the voicemail system associated with the callee without delivering the voicemail to the callee such that the callee is unable to access the voicemail message; and in response to receiving a selection to send the saved draft of the voicemail message, delivering the voicemail message to the callee such that the callee is able to access the voicemail message.

19. The system of claim 18, further comprising receiving input from the caller to modify the body of the voicemail message; and updating the conversational data in the body of the voicemail message to reflect the input received from the caller.

20. The system of claim 18, further comprising displaying an edit user interface component that provides controls for modifying the body of the voicemail message.

\* \* \* \* \*